(12) United States Patent
Graff et al.

(10) Patent No.: US 8,285,628 B1
(45) Date of Patent: Oct. 9, 2012

(54) SECURITIZED POOL OF PERSONAL-SMALL-AIRCRAFT MORTGAGES SYSTEM

(75) Inventors: Richard A. Graff, Chicago, IL (US); James M. McKevitt, Glenview, IL (US)

(73) Assignee: Ross/Graff Holdings LLC, Chicago, IL (US)

( * ) Notice: Subject to any disclaimer, the term of this patent is extended or adjusted under 35 U.S.C. 154(b) by 827 days.

(21) Appl. No.: 11/825,505

(22) Filed: Jul. 6, 2007

Related U.S. Application Data

(60) Provisional application No. 60/872,993, filed on Dec. 5, 2006.

(51) Int. Cl.
*G06Q 40/00* (2012.01)
(52) U.S. Cl. ................................ 705/37; 705/36 R
(58) Field of Classification Search ............ 705/37
See application file for complete search history.

(56) References Cited

U.S. PATENT DOCUMENTS

| | | | |
|---|---|---|---|
| 3,426,676 A | 2/1969 | Zielke | |
| 3,581,072 A | 5/1971 | Nymeyer | 235/152 |
| 3,648,256 A | 3/1972 | Paine et al. | 340/172.5 |
| 4,281,312 A | 7/1981 | Knudson | 340/146.3 |
| 4,412,287 A | 10/1983 | Braddock, III | 364/408 |
| 4,564,044 A | 1/1986 | Biller et al. | 137/625.24 |
| 4,591,983 A | 5/1986 | Bennett et al. | 364/403 |
| 4,739,478 A | 4/1988 | Roberts et al. | 364/408 |
| 4,789,928 A | 12/1988 | Fujisaki | 364/401 |
| 4,823,265 A | 4/1989 | Nelson | 364/408 |
| 4,831,526 A | 5/1989 | Luchs et al. | 364/401 |
| 4,860,238 A | 8/1989 | Kraker | 364/721 |
| 4,903,201 A | 2/1990 | Wagner | 364/408 |
| 4,914,570 A | 4/1990 | Peacock | 364/200 |
| 4,980,826 A | 12/1990 | Wagner | 364/408 |
| 5,038,284 A | 8/1991 | Kramer | 364/408 |
| 5,077,665 A | 12/1991 | Silverman et al. | 364/408 |
| 5,101,353 A | 3/1992 | Lupien et al. | 364/408 |
| 5,133,480 A | 7/1992 | Matsumoto et al. | 222/2 |
| 5,136,501 A | 8/1992 | Silverman et al. | 364/408 |
| 5,136,694 A | 8/1992 | Belt et al. | 395/275 |
| 5,142,624 A | 8/1992 | Patrick, II | 395/200 |
| 5,161,102 A | 11/1992 | Griffin et al. | 395/800 |
| 5,166,669 A | 11/1992 | Romberg | 340/711 |
| 5,168,446 A | 12/1992 | Wiseman | 364/408 |
| 5,184,232 A | 2/1993 | Burney | 359/32 |
| 5,220,500 A | 6/1993 | Baird et al. | 364/408 |
| 5,237,500 A | 8/1993 | Perg et al. | 364/408 |
| 5,241,466 A | 8/1993 | Perry et al. | 364/401 |

(Continued)

OTHER PUBLICATIONS

A securitisation primer for first time issuers I Global Securitisation and Structured Finance 2003 Joel Telpner Greenberg Traurig.*

(Continued)

*Primary Examiner* — Hani M Kazimi
*Assistant Examiner* — Chuks Onyezia
(74) *Attorney, Agent, or Firm* — Peter K. Trzyna, Esq.

(57) ABSTRACT

Illustratively, there can be a securitization system that is comprised of a computer or computers using a network, and a process, for the conversion of assets into marketable securities. In one embodiment, the securitization system includes a distribution system to distribute at least some of the marketable securities generated by the securitization system to one or more buyers. The process may utilize a new definition of securitization that expands the universe of securitizable assets, the universe of asset securitization methodologies, and the universe of securities that can be designed and generated thereby.

43 Claims, 4 Drawing Sheets

U.S. PATENT DOCUMENTS

Figure 1:
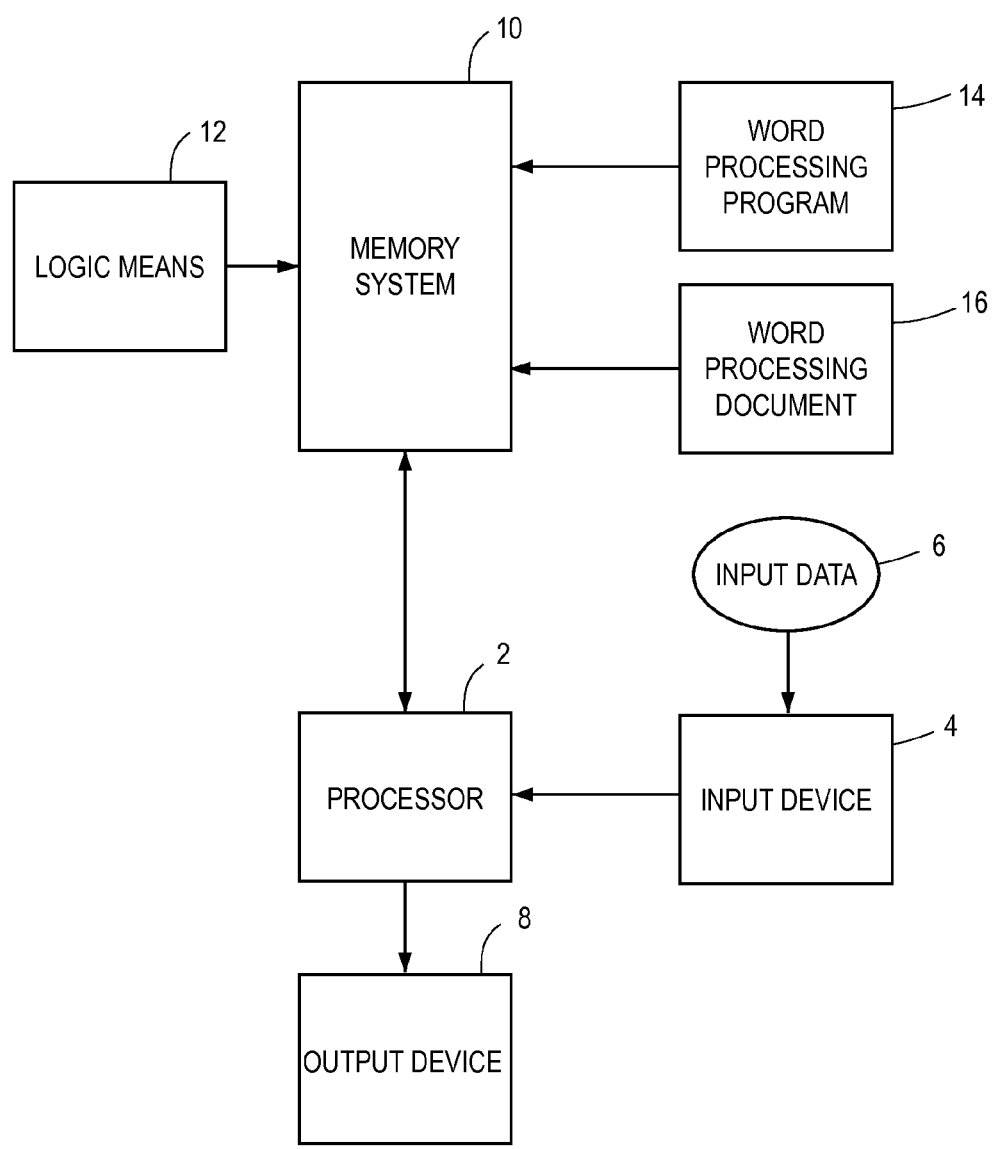

| Patent No. | Date | Inventor | Class |
|---|---|---|---|
| 5,243,331 A | 9/1993 | McCausland et al. | |
| 5,243,515 A | 9/1993 | Lee | 364/401 |
| 5,257,366 A | 10/1993 | Adair et al. | 395/600 |
| 5,307,501 A | 4/1994 | Yuge | 395/800 |
| 5,323,315 A | 6/1994 | Highbloom | 364/408 |
| 5,326,104 A | 7/1994 | Pease et al. | 273/138 |
| 5,335,169 A | 8/1994 | Chong | 364/408 |
| 5,361,201 A | 11/1994 | Jost et al. | 364/401 |
| 5,375,055 A | 12/1994 | Togher et al. | 364/408 |
| 5,414,621 A | 5/1995 | Hough | 364/401 |
| 5,497,317 A | 3/1996 | Hawkins et al. | 364/408 |
| 5,502,637 A | 3/1996 | Beaulieu et al. | 364/408 |
| 5,502,778 A | 3/1996 | Ishikawa et al. | 382/239 |
| 5,557,517 A | 9/1996 | Daughterty, III | 364/408 |
| 5,640,569 A | 6/1997 | Miller et al. | 395/729 |
| 5,774,176 A | 6/1998 | Carter | 348/83 |
| 5,774,880 A | 6/1998 | Ginsberg | 705/36 |
| 5,787,434 A | 7/1998 | Nakamura et al. | 707/102 |
| 5,794,207 A | 8/1998 | Walker et al. | 705/23 |
| 5,802,501 A | 9/1998 | Graff | |
| 5,806,048 A | 9/1998 | Kiron et al. | |
| 5,845,266 A | 12/1998 | Lupien et al. | 705/37 |
| 5,857,176 A | 1/1999 | Ginsberg | 705/36 |
| 5,905,974 A | 5/1999 | Fraser et al. | 705/37 |
| 5,905,975 A | 5/1999 | Ausubel | 705/37 |
| 5,913,198 A | 6/1999 | Banks | 705/4 |
| 5,915,209 A | 6/1999 | Lawrence | 455/31.2 |
| 5,950,175 A | 9/1999 | Austin | 705/35 |
| 5,983,204 A | 11/1999 | Debe | 705/36 |
| 6,088,685 A | 7/2000 | Kiron et al. | |
| 6,161,099 A | 12/2000 | Harrington et al. | 705/37 |
| 6,167,384 A | 12/2000 | Graff | |
| 6,192,347 B1 | 2/2001 | Graff | |
| 6,347,302 B1 | 2/2002 | Joao | 705/4 |
| 6,393,406 B1 | 5/2002 | Eder | |
| 6,622,129 B1* | 9/2003 | Whitworth | 705/37 |
| 6,760,709 B2 | 7/2004 | Graff | |
| 7,107,239 B2 | 9/2006 | Graff | |
| 7,152,044 B2 | 12/2006 | Graff | |
| 7,203,661 B1 | 4/2007 | Graff | |
| 7,295,987 B2 | 11/2007 | Graff | |
| 7,505,934 B1 | 3/2009 | Graff | |
| 7,599,886 B1 | 10/2009 | Lambert | |
| 7,685,053 B2 | 3/2010 | Graff | |
| 7,698,192 B2 | 4/2010 | Kiron et al. | |
| 7,865,416 B1 | 1/2011 | Graff et al. | |
| 2002/0133422 A1 | 9/2002 | Graff | |
| 2002/0138419 A1 | 9/2002 | Melone et al. | |
| 2002/0156658 A1 | 10/2002 | Selesny et al. | |
| 2003/0014342 A1 | 1/2003 | Vande Pol | |
| 2003/0074293 A1 | 4/2003 | Kiron et al. | |
| 2003/0225665 A1 | 12/2003 | Gross et al. | 705/36 |
| 2003/0225685 A1 | 12/2003 | Dickerson | |
| 2003/0229555 A1 | 12/2003 | Marlowe-Noren | |
| 2004/0128233 A1 | 7/2004 | Jarzmik | |
| 2004/0177029 A1 | 9/2004 | Hammour et al. | 705/38 |
| 2005/0004861 A1* | 1/2005 | Bancroft | 705/38 |
| 2005/0038734 A1 | 2/2005 | Graff | |
| 2005/0055293 A1 | 3/2005 | Birle et al. | |
| 2005/0119962 A1 | 6/2005 | Bowen et al. | |
| 2006/0031082 A1 | 2/2006 | Amaitis et al. | |
| 2006/0074787 A1 | 4/2006 | Perg et al. | |
| 2006/0224494 A1 | 10/2006 | Pinkava | |
| 2007/0226004 A1 | 9/2007 | Harrison | |
| 2008/0065529 A1 | 3/2008 | Bowen et al. | |
| 2008/0091476 A1 | 4/2008 | Graff | |
| 2008/0120247 A1 | 5/2008 | Graff | |
| 2009/0106142 A1 | 4/2009 | Lange et al. | |

OTHER PUBLICATIONS

Archa Saran Faculty of Law Institute of Air and Space Law, McGill University Montréal, Aug. 2008.*

Electrum Partners, L.L.C., *Intuitive Synthetic Debt*, Innovations in Asset-Backed Finance, 2004. pp. 1-4.

Electrum Partners, L.L.C., *Proprietary Technology*, Innovations in Asset-Backed Finance, 2003. pp. 1-2.

Electrum Partners, L.L.C., *Advantages for Corporate Finance*, 2002. p. 1.

Electrum Partners, L.L.C., *Advantages for Tax-Exempt Investors*, 2002. p. 1.

Electrum Partners, L.L.C., *Completely Leased Property=Synthetic Debt*, 2002. p. 1.

Electrum Partners, L.L.C., *Defusing Synthetic Lease Off-Balance-Sheet Time Bombs*, 2002. p. 1.

Electrum Partners, L.L.C., *An Investment Lesson from the Career of an American Sports Hero*, 2003. pp. 1-2.

Electrum Partners, L.L.C., *Lease-Based Synthetic Debt*, 2002. p. 1.

Electrum Partners, L.L.C., *Leverage Without Debt in Real Estate Finance: Two Deeds Instead of a Lien*, 2002. p. 1.

Electrum Partners, L.L.C., *The Real Estate Magic of Electrum Synthetic Debt*, 2004. pp. 1-2.

Electrum Partners, L.L.C., *Possible Misperceptions About Split Purchases of Term-of-Years and Remainder Interests in Property*, 2003. pp. 1-2.

Electrum Partners, L.L.C., *Synthetic Debt from the Financier Perspective*, 2001 and 2002. p. 1.

DeAngelo, H. and R. W. Masulis, Optimal Capital Structure Under Corporate and Personal Taxation, *Journal of Financial Economics* 8 (Mar. 1980), 5-29.

Del Cotto, L. A., "Property" in the Capital Asset Definition: Influence of "Fruit and Tree", *Buffalo Law Review* 15 (Fall 1965), 1-60.

Epstein, Richard A., Past and Future: The Temporal Dimension in the Law of Property, *Washington University Law Quarterly* (Fall 1986), 667-722.

Graff, Richard A. and Daniel M. Cashdan, Some New Ideas in Real Estate Finance, *Journal of Applied Corporate Finance*, 1990, 3:1, 77-89.

Anonymous, *Perpetual Savings Offers Securitized Seconds*, Private Placement Reporter, vol. 1, No. 6, Feb. 18, 1991.

Anonymous, *Use of Super Seniors Grows: Structure Receives Mixed Reviews*, Mortgage-Backed Securities Letter, vol. VII, No. 15, Apr. 13, 1992.

Benninga, Simon, *Financial Modeling*, Chapters 15-17, The MIT Press, Cambridge, Massachusetts, 1997.

Boyle, N., *Chrysler Financial Packages Municipal Leases, Insured by MBIA, for Sale on the Open Market*, The Bond Buyer, vol. 292, No. 28444, p. 2(386), Jul. 25, 1990.

Guttentag, J. M., *The Evolution of Mortgage Concepts*, Financial Analysts Journal 48, Jan./Feb. 1992, 39-46.

Eichberger, J. and I. R. Harper, *Financial Economics*, New York, Oxford University Press, 1997.

Fabozzi, Frank J. (Ed.), *The Handbook of Mortgage-Backed Securities*, New York, McGraw-Hill, 2001 (see, especially: Chapters 1, 2, 19, 35, 38).

Bhattacharya, Anand K. and Frank J. Fabozzi (Eds.), *Asset-Backed Securities*, New Hope, Pennsylvania, Frank J. Fabozzi Associates, 1996 (see, especially: Chapters 1, 15).

Fabozzi, Frank J. (Ed.), *Handbook of Fixed Income Securities, Fifth Edition*, McGraw-Hill, 1997.

Fabozzi, Frank J. (Ed.), *Handbook of Structured Financial Products*, New Hope, Pennsylvania, Frank J. Fabozzi Associates, 1998 (see, especially: Chapters 1, 2, 16).

Kothari, Vinod, *Securitization: The Financial Instrument of the Future*, Singapore, John Wiley and Sons, 2006 (see, especially: Chapter 1).

Borron, John A. Jr. Judge. *Simes and Smith: The Law of Future Interests*. Borron Third Edition. Sections 1 to 570, vol. 1. Thompson West. 2002-2007.

Anonymous, Review of Jun. 16, 2005 draft of "Securitization Demystified", Aug. 2005.

Graff, Richard A., Perspectives on Debt-and-Equity Decomposition for Investors and Issuers of Real Estate Securities, *Journal of Real Estate Research*, 1992, 7:4, 449-67.

Graff, Richard A., Changing Leases into Investment-Grade Bonds: Financial Alchemy and Cost Reduction in Real Estate Finance, *Journal of Real Estate Portfolio Management*, 1999, 5:2, 183-94.

Graff, Richard A., Economic Analysis Suggests that REIT Investment Characteristics are Not as Advertised, *Journal of Real Estate Portfolio Management*, 2001, 7:2, 99-124.

Graff, Richard A., Off-Balance-Sheet Corporate Finance with Synthetic Leases: Shortcomings and How to Avoid Them with Synthetic Debt, *Journal of Real Estate Research*, 2001, 22:1/2, 213-41.
Graff, Richard A., Off-Balance-Sheet Corporate Finance for the Twenty-First Century, *Journal of Real Estate Portfolio Management*, 2002, 8:1, 45-54.
Graff, Richard A., Securitization Demystified, Draft, Apr. 11, 2005.
Graff, Richard A., Securitization Demystified, Draft, Jun. 8, 2005.
Graff, Richard A., Securitization Demystified, Draft, Jun. 16, 2005.
Gray, John Chapman, Future Interests in Personal Property, *Harvard Law Review*, vol. 14, No. 6, Feb. 1901, 397-420.
McNamee, Mike, Your Mortgage Was His Bond, *Business Week*, Nov. 29, 2004, 18.
John A. Anderson, "Notice of Allowance" mailed on Nov. 11, 2010, in U.S. Appl. No. 11/825,517, filed Jul. 6, 2007. pp. 1-145. USA.
Sanjeev Malhotra, "Interview Summary" mailed on Aug. 19, 2010, in U.S. Appl. No. 11/825,503, filed Jul. 6, 2007. pp. 1-4. USA.
Sanjeev Malhotra, "Interview Summary" mailed on Mar. 16, 2010, in U.S. Appl. No. 11/825,503, filed Jul. 6, 2007. pp. 1-3. USA.
Sanjeev Malhotra, "Office Action" mailed on Sep. 14, 2010, in U.S. Appl. No. 11/825,503, filed Jul. 6, 2007. pp. 1-62. USA.
John A. Anderson, "Interview Summary" mailed on Oct. 27, 2010, in U.S. Appl. No. 11/825,517, filed Jul. 6, 2007. pp. 1-3. USA.
Susanna M. Meinecke Diaz, "Office Action-Final Rejection" mailed on Aug. 4, 2010, in U.S. Appl. No. 10/885,569, filed Jul. 6, 2004. pp. 1-36. USA.
Peter K. Trzyna, "Response and Request for Reconsideration" filed on Oct. 4, 2010, in U.S. Appl. No. 10/885,569, filed Jul. 6, 2004. pp. 1-32. USA.
Webster'S Dictionary, Definition of word Deed from Webster's Dictionary—1913 and 1828 editions (2 pages).
Webster'S Dictionary, Definition of word Mortgage from Webster's Dictionary—1913 and 1828 editions (2 pages).
Peter K. Trzyna, "Amendment and Response" filed on Nov. 12, 2010, in U.S. Appl. No. 11/825,504, filed Jul. 6, 2007. pp. 1-32. USA.
Abdul Basit, "Interview Summary" mailed on Aug. 16, 2010, in U.S. Appl. No. 11/825,504, filed Jul. 6, 2007. pp. 1-3. USA.
Abdul Basit, "Office Action-Final Rejection" mailed on Dec. 15, 2010, in U.S. Appl. No. 11/825,504, filed Jul. 6, 2007. pp. 1-39. USA.
James A. Vezeris, "Notice of Allowance" mailed on Feb. 8, 2011, in U.S. Appl. No. 11/599,086, filed Nov. 14, 2006. pp. 1-21. USA.
Penny L. Caudle, "Appeal Brief" filed on Dec. 20, 2010, in Application Control No. 90/009,556, filed on Aug. 7, 2009. pp. 1-19. USA.
Sam Rimell, "Office Action in Ex Parte Reexamination" mailed on Aug. 2, 2010, in Application Control No. 90/009,556, filed on Aug. 7, 2009. pp. 1-34. USA.
Michael K. Mutter, "Response to Final Action Under 37 C.F.R. 1.116" filed on Sep. 30, 2010, in Application Control No. 90/009,556, filed on Aug. 7, 2009. pp. 1-13. USA.
Sam Rimell, "Ex Parte Reexamination Advisory Action" mailed on Oct. 22, 2010, in Application Control No. 90/009,556, filed on Aug. 7, 2009. pp. 1-9. USA.
"Preliminary Amendment" filed on Dec. 27, 2007, in U.S. Appl. No. 11/825,503, filed Jul. 6, 2007, by inventors Richard A. Graff and James M. McKevitt.
"Office Action-Requirement for Restriction/Election" mailed on Mar. 18, 2010, in U.S. Appl. No. 11/825,503, filed Jul. 6, 2007, by inventors Richard A. Graff and James M. McKevitt.
"Amendment and Response to Requirement for Restriction/Election" filed on Jun. 24, 2010, in U.S. Appl. No. 11/825,503, filed Jul. 6, 2007, by inventors Richard A. Graff and James M. McKevitt.
"Office Action-Requirement for Restriction/Election" mailed on Jun. 23, 2010, in U.S. Appl. No. 11/825,517, filed Jul. 6, 2007, by inventors Richard A. Graff and James M. McKevitt.
"Amendment and Response" filed on May 13, 2010, in U.S. Appl. No. 11/825,517, filed Jul. 6, 2007, by inventors Richard A. Graff and James M. McKevitt.
"Second Preliminary Amendment and Remarks" filed on Apr. 21, 2010, in U.S. Appl. No. 11/825,517, filed Jul. 6, 2007, by inventors Richard A. Graff and James M. McKevitt.
"Office Action" mailed on Apr. 14, 2010, in U.S. Appl. No. 11/825,517, filed Jul. 6, 2007, by inventors Richard A. Graff and James M. McKevitt.
"Preliminary Amendment and Remarks" filed on Mar. 26, 2010, in U.S. Appl. No. 11/825,517, filed Jul. 6, 2007, by inventors Richard A. Graff and James M. McKevitt.
"Preliminary Amendment" filed on Dec. 27, 2007, in U.S. Appl. No. 11/825,517, filed Jul. 6, 2007, by inventors Richard A. Graff and James M. McKevitt.
"Office Action" mailed on May 12, 2010, in U.S. Appl. No. 11/825,504, filed Jul. 6, 2007, by inventors Richard A. Graff and James M. McKevitt.
"Second Preliminary Amendment and Remarks" filed on May 11, 2010, in U.S. Appl. No. 11/825,504, filed Jul. 6, 2007, by inventors Richard A. Graff and James M. McKevitt.
"Preliminary Amendment and Remarks" filed on Apr. 12, 2010, in U.S. Appl. No. 11/825,504, filed Jul. 6, 2007, by inventors Richard A. Graff and James M. McKevitt.
"Preliminary Amendment" filed on Dec. 27, 2007, in U.S. Appl. No. 11/825,504, filed Jul. 6, 2007, by inventors Richard A. Graff and James M. McKevitt.
U.S. Appl. No. 60/872,993, filed Dec. 5, 2006, by inventor Richard A. Graff.
"Notice of Allowance" mailed on Mar. 10, 2010, in U.S. Appl. No. 11/599,086, filed Nov. 14, 2006, by inventor Richard A. Graff.
"Wall Street; Let the Sun Shine on Muni Bonds" by Diana B. Henriques for the New York Times Mar. 3, 1991.
"The Nasdaq Stock Market, Inc." http://www.answers.com/topic/the-nasdaq-stock-market-inc.
"Office Action-Restriction Requirement" mailed on Aug. 20, 2009, in U.S. Appl. No. 11/599,086, filed Nov. 14, 2006, by inventor Richard A. Graff.
"Response to Restriction Requirement" filed on Mar. 26, 2009, in U.S. Appl. No. 11/599,086, filed Nov. 14, 2006, by inventor Richard A. Graff.
"Office Action-Restriction Requirement" mailed on Apr. 2, 2009, in U.S. Appl. No. 11/599,086, filed Nov. 14, 2006, by inventor Richard A. Graff.
"Second Preliminary Amendment" filed on Dec. 17, 2007, in U.S. Appl. No. 11/599,086, filed Nov. 14, 2006, by inventor Richard A. Graff.
"Ex Parte Reexamination Non-Final Office Action" mailed on Feb. 12, 2010, in Reexamination Control No. 90/009,556 filed on Aug. 7, 2009, by inventor Richard A. Graff.
"Response to First Non-Final Office Action" filed on Apr. 12, 2010, in Reexamination Control No. 90/009,556 filed on Aug. 7, 2009, by inventor Richard A. Graff.
"Amendment and Response" filed on May 24, 2010, in U.S. Appl. No. 10/885,569, filed Jul. 6, 2004, by inventor Richard A. Graff.
"Supplemental Non-Final Rejection" mailed on Dec. 3, 2009, in U.S. Appl. No. 10/885,569, filed Jul. 6, 2004, by inventor Richard A. Graff.
"Office Action Non-Final Rejection" mailed on Apr. 17, 2009, in U.S. Appl. No. 10/885,569, filed Jul. 6, 2004, by inventor Richard A. Graff.
Hawkins. George B. "Using Business Valuation Techniques to Quantify Discounts for Fractional Interests in Real Estate." Banister Financial,Inc. Reprinted from the Spring 1997 Issue.
Schlenger et al. "Discount Available When Property Was Held Partly Outright and Partly in QTIP Trust." Estate Planning, vol. 23, No. 9, p. 435(2), Nov. 1996.
Davidson, Brad. "Valuation of Fractional Interests in Real Estate Limited Partnerships—Another Approach." The Appraisal Journal, vol. 60. No. 2, p. 184(11), Apr. 1992.
"Office Action Non-Final" mailed on Jun. 26, 2008, in U.S. Appl. No. 10/885,569, filed Jul. 6, 2004, by inventor Richard A. Graff.
"Preliminary Amendment" filed on Jun. 20, 2008, in U.S. Appl. No. 10/885,569, filed Jul. 6, 2004, by inventor Richard A. Graff.
"Preliminary Amendment" filed on Aug. 21, 2007, in U.S. Appl. No. 10/580,083, filed Jul. 6, 2004, by inventor Richard A. Graff.
"Preliminary Amendment" filed on Jun. 2, 2010, in U.S. Appl. No. 12/792,270, filed Jun. 2, 2010, by inventor Richard A. Graff.
"Water Right" Wikipedia. Jul. 3, 2007. http://en.wikipedia.org/wiki/Water_right, pp. 1-3.

"Oregon Water Laws" Water Resources Department. Jul. 3, 2007. http://www.wrd.state.or.us/OWRD/PUBS/aquabook_laws.shtml, pp. 1-3.

New Mexico Office of the State Engineer, Interstate Stream Commission. Jul. 3, 2007. http://www.ose.state.nm.us/faq_index.html, pp. 1-4.

Waskom, R., Marx, E., Wolfe, D. and Wallace, G. "Irrigation Ditches and their Operation" Colorado State University Extension. Jul. 3, 2007. http://www.ext.colostate.edu/PUBS/natres/06701.html, pp. 1-5.

"International Search Report" mailed on Aug. 29, 2005, in International Application No. PCT/US04/39041, filed on Nov. 19, 2004, by inventor Richard A. Graff.

"Written Opinion" mailed on Aug. 29, 2005, in International Application No. PCT/US04/39041, filed on Nov. 19, 2004, by inventor Richard A. Graff.

Web Pages of Projector Center labeled as Projector Center, 2000-2002.

* cited by examiner

SECURITIZED POOL OF PERSONAL-SMALL-AIRCRAFT MORTGAGES SYSTEM

I. PRIORITY STATEMENT

The present patent application claims benefit from and incorporates by reference from U.S. Patent Application Ser. No. 60/872,993 filed Dec. 5, 2006; this also incorporates by reference U.S. Pat. Nos. 6,760,709 B2 issued Jul. 6, 2004, both naming Richard A. Graff as inventor.

II. TECHNICAL FIELD OF THE INVENTION

The technical field is computers and data processing systems. Depending on the implementation, there is apparatus, a method for use and method for making, and corresponding products produced thereby, as well as data structures, computer-readable media tangibly embodying program instructions, manufactures, and necessary intermediates of the foregoing, each pertaining to digital aspects of wide area network communications.

II. BRIEF DESCRIPTION OF THE DRAWINGS

Figure 2:
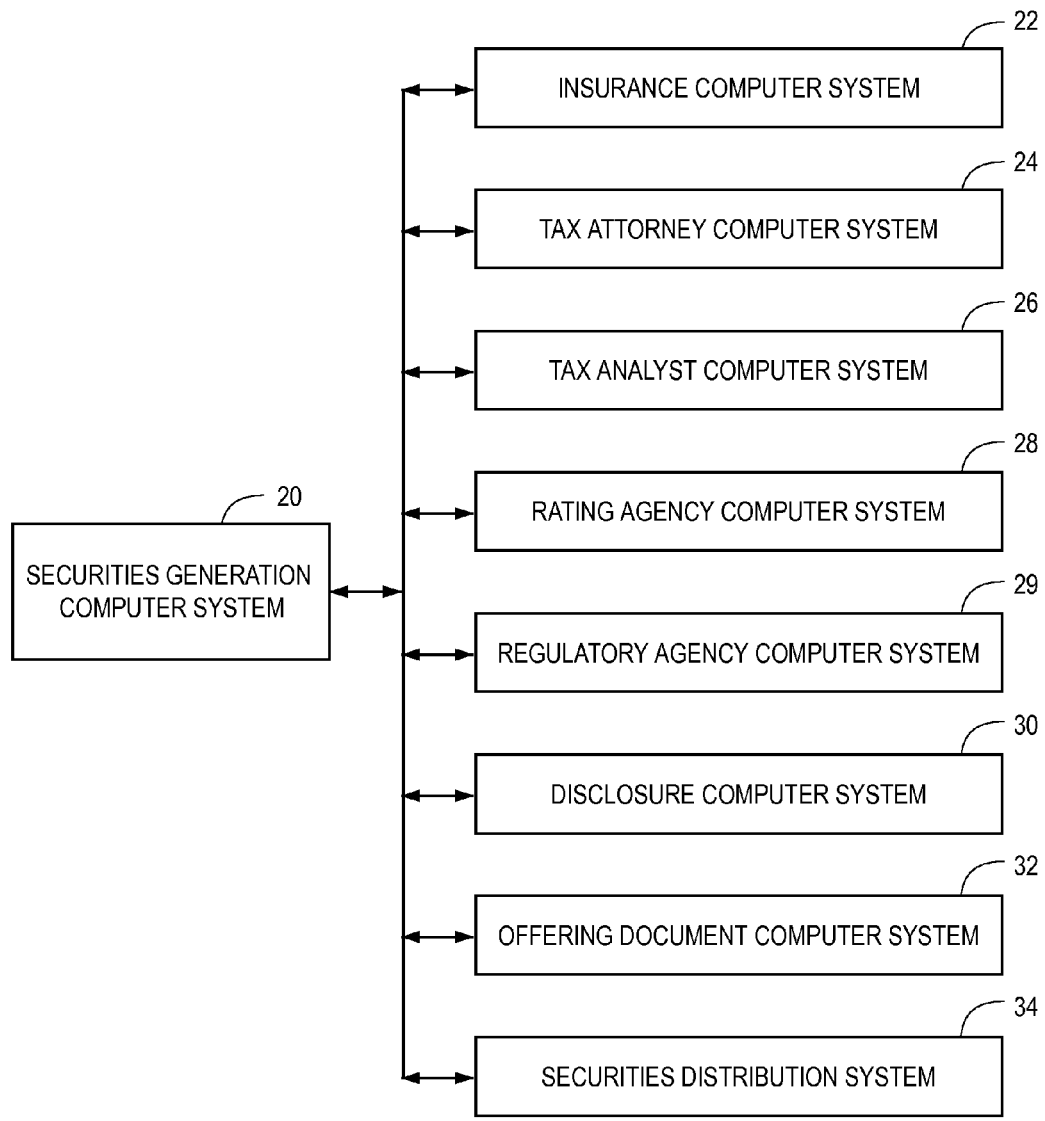
Figure 3:
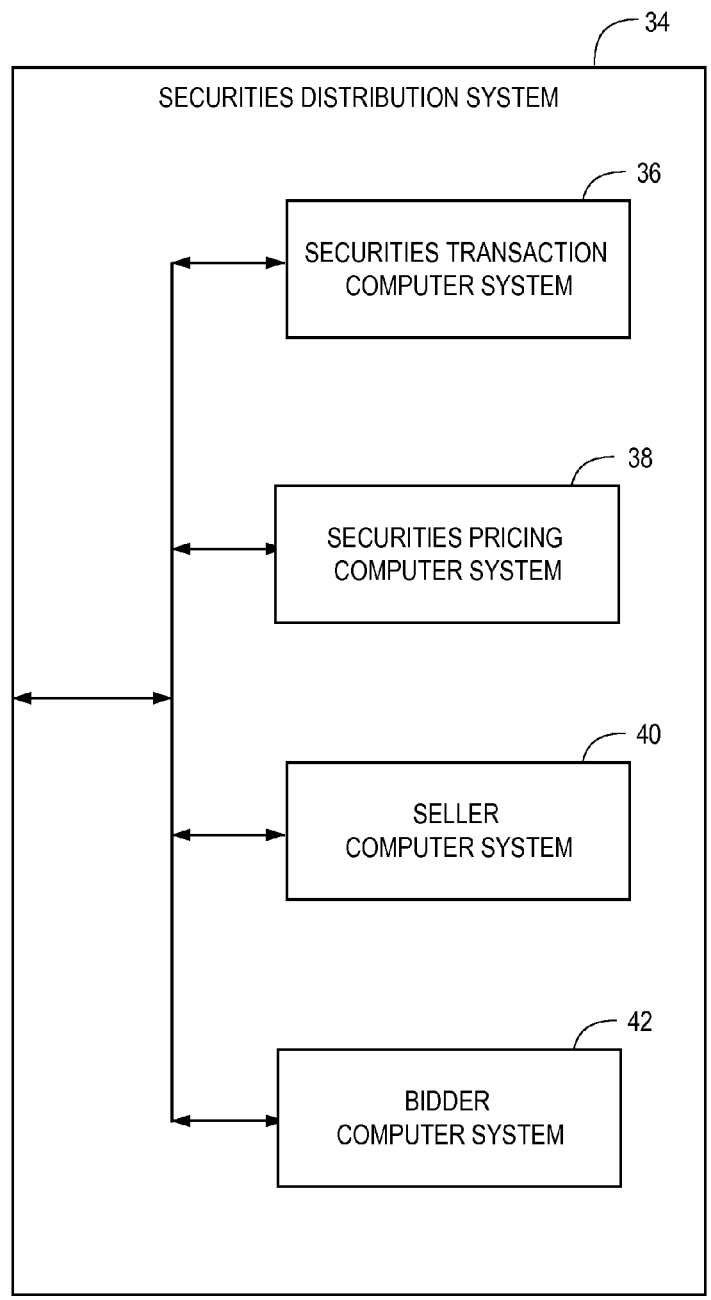
Figure 4:
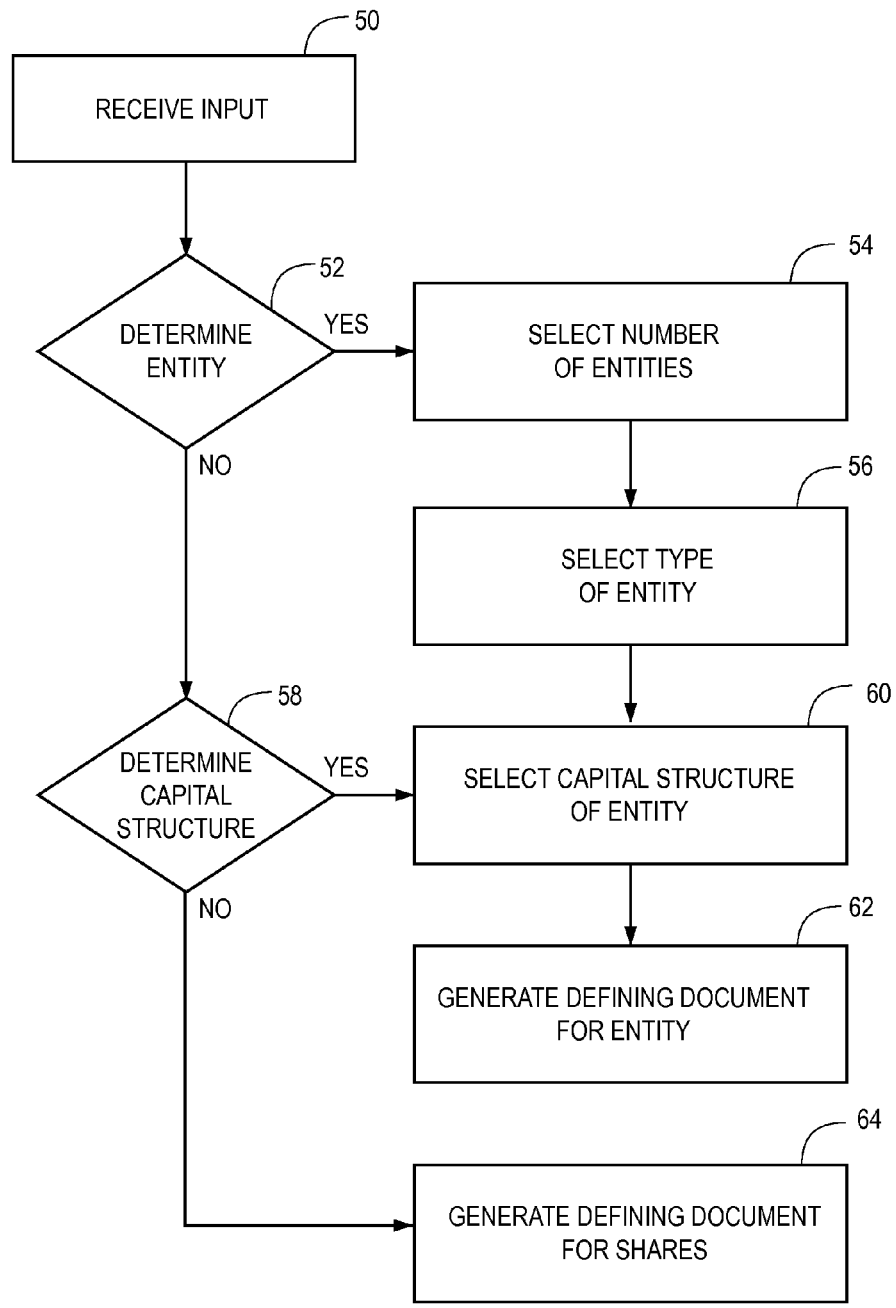

FIG. 1 illustrates an embodiment.
FIG. 2 illustrates an embodiment.
FIG. 3 illustrates an embodiment.
FIG. 4 illustrates an embodiment.

III. MODES

For perspective, financial engineering has developed into a complex and sophisticated subject in the last 15 years, and securitization is almost certainly its most exciting and dynamic area. This represents a major shift in perspective within the financial community. Although the concept of a financial security has been familiar to investors for more than 150 years, the concept of securitization was arcane and unfamiliar to most financial professionals as recently as 20 years ago.

Securitization has become a financial buzzword in the last 15 years, but many investors and investment managers find it difficult to describe precisely what securitization is. Many are also unable to distinguish the actual investment attributes of securitized investment products from the advertised attributes.

These issues are more relevant today than in the past because of the basic tenet of Modern Portfolio Theory (MPT): in reasonably efficient liquid markets, diversification lowers investment risk more than it lowers investment return. It follows from the basic tenet that portfolio managers generally—although not always—improve the risk/return profiles of investment portfolios by diversifying the portfolios to the maximum feasible extent. As a result, highly diversified portfolios have come to serve as benchmarks throughout the investment industry for evaluating the on-going performance of investment managers.

Investment regulators, courts and legislators have embraced the basic tenet of MPT as a guiding principle that financial fiduciaries ignore at their peril. For example, in the extreme case of pension fund regulation, fund fiduciaries can be held personally liable for any suboptimal performance of pension fund investments if they fail to ensure strict adherence of pension fund investments to the basic tenet of MPT.

It follows that investment bankers have a guaranteed demand side clientele in markets for any new investment banking products that securitize assets with well-identified investment characteristics not replicated by existing financial products. This ensures the continuing attention of the financial industry to securitization research and applications. In particular, the financial industry—and the corporate sector in general—has incentive to understand the complete meaning and scope of the securitization concept.

One problem with new concepts is that the original definition may not constitute the best description for purposes of fostering related innovations. For example, the first definition of securitization was a working description of the process for generating residential mortgage-backed securities, which is essentially how securitization is still perceived by many practitioners and academics. This is a highly significant and visible application in the economies of developed countries, which may explain why the original ad hoc definition has not been replaced with a definition that is more conceptual, despite the boost to new product design, e.g., new types of securities, that could result.

Embodiments herein introduce a definition of securitization that shifts the focus of the process from its effect on specific assets to its effect on the specific investment characteristics of assets in general. This shift can achieve two disparate objectives: it provides a unifying framework for several types of financial applications that were not viewed previously as related, and it enables an economic link to be established from the effect of securitization on assets to the effect of securitization on asset value. As a related benefit, it suggests simple criteria for predicting the viability of new securitization methodologies.

This discussion examines the securitization concept and the extent to which it has evolved since its inception. The attribute-oriented definition of securitization is introduced and the link from changes in investment characteristics to changes in value is established. The economic characteristics of three broad asset classes in which securitization has significant applications are examined, and the widely varying securitization methodologies employed in the three cases to achieve common economic objectives are discussed. Finally, some new securitized assets that can be created with the securitization apparatus disclosed herein.

Definition of Securitization

The original working definition of securitization as a process to generate residential mortgage-backed securities (MBS) was coined in the late 1970s by Lewis Ranieri, at that time head of the then-fledgling mortgage-trading department at Salomon Brothers. The concept was introduced as part of a marketing program to develop a secondary market in home mortgages by distributing the first privately generated residential MBS to institutional investors. The period since then has witnessed an explosion in the generation of residential MBS (e.g., in structured form, also known as Collateralized Mortgage Obligations) and related fixed-income products, particularly during the last fifteen years. Numerous weighty treatises have appeared describing the technical structure and investment analysis of the resulting securities. However, the treatises are more tentative when it comes to characterizing conceptually what they are describing. There is no standard definition of securitization, and many definitions are ad hoc variations of the original working definition.

Numerous examples in the relevant art demonstrate the unsettled state of securitization concepts. For example, Frank Fabozzi, author or editor of several how-to texts on securitized fixed income products, observes in a 1998 volume on structured financial products that there is no widely accepted definition of an asset-backed security and describes the U.S. perception of asset-backed securities as "securities in which the underlying assets are anything other than first mortgage loans on residential on-site built homes." Another contributing author to the same volume observes that, "Exact definitions of what constitutes an international asset-backed security may differ . . . "

Examination of the most recent editions of Webster's Collegiate Dictionary confirms the continuing popularity of the original working definition: the tenth and eleventh editions (published in 1993 and 2004 respectively) include a definition of securitize (i.e., the verb that corresponds to the noun "securitization") that is close to a verb analogue of the Salomon Brothers working definition: "to consolidate (as mortgage loans) and sell to other investors for resale to the public." The ninth edition of the dictionary (published in 1983) does not contain any reference to 'securitization' or 'securitize,' which confirms that widespread awareness of the securitization concept is a recent phenomenon.

An apparent shortcoming of these definitions is that they do not encompass one of the most significant securities-generation businesses in which investment banks have engaged. One of the primary activities of investment banks since the 1840s has been converting private firms into publicly traded corporations, i.e., securitizing equity investments in organized businesses.

Two slightly more conceptual definitions of "securitization" can be found in a 1996 treatise on asset-backed securities and a 1997 Oxford University Press text on financial economics: (1) "the process by which loans, consumer installment contracts, leases, receivables, and other relatively illiquid assets with common features are packaged into interest-bearing securities with marketable investment characteristics; "and (2) "the process whereby financial intermediaries, banks in particular, convert claims held on their balance sheets into marketable securities."

These definitions are still somewhat limited. For example, the first definition restricts securitization to pools of debt-like instruments, and the second one restricts securitization to the balance sheet claims of financial intermediaries such as banks.

Embodiments herein shift the focus of the definition from the types of assets to be securitized to the investment characteristics of the assets, on the assumption that investors typically base decisions on which investment assets they are interested in buying and how much they are willing to pay in part on at least some of the investment characteristics. For example, in the case of investment securities, one of the investment characteristics usually appears to be the characteristic of limited liability, which for purposes herein is defined as follows: an asset has the limited liability investment characteristic if an equity interest in the asset does not expose its owner to any risk of loss greater than the gross purchase price of the equity interest. For purposes herein, an asset with the limited liability investment characteristic is referred to as a limited liability asset.

Accordingly, consider the following definition of securitization: securitization noun: "the process whereby illiquid interests in property are converted into marketable limited liability securities consisting, or consisting essentially, of the investment characteristics of the original interests other than illiquidity and liability exposure." In this definition, it is intended that the process includes changes in the other characteristics resulting from changing the illiquidity and liability exposure.

In the case of the securitization of multiple interests in property, the multiple "interests in property" are not necessarily interests in the same property. For example, in the case of a securitized residential mortgage pool, the mortgages are usually loans on different properties.

This definition specifies securitization to be a process that generates securities and identifies the investment characteristics of the input and output that are transformed by the process: "limited liability," "illiquid" and "marketable." The definition also requires securities generated by the process essentially to preserve the signature investment characteristics of the input assets. In addition, the definition encompasses the equity securitization process that is prominent in modern market economies, it encompasses the consolidation process that is the subject of the definition in Webster's dictionary, and it encompasses the variations of the original working definition cited above.

Many applications involve assets that already have the limited liability investment characteristic. Thus in many cases securitization is a process that improves asset liquidity without materially affecting other asset investment characteristics for purposes of investment. Only one point remains to be clarified: the definition of a security, which once specified will complete the specification of securitization in virtually all cases.

Securities

The concept of a security has grown more complex over the past several centuries. In pre-industrial Britain and America, there were essentially two basic types of interests in property, most of which (by value) related to real estate: equity interests, signifying ownership; and security interests, signifying debt collateralized by the property. At the time, a security was considered to be documentation evidencing a security interest in property: either a specified property or unspecified property belonging to a specified legal entity or entities. Organized exchanges, for example, financial exchanges such as the New York Stock Exchange, arose to facilitate the transfer of securities that were more or less standardized in security rights and documentary format and that were limited liability investments.

With the development and proliferation of the modern unrestricted purpose limited liability corporation in Britain and America in the first half of the nineteenth century, the concept of a security was extended to include documentation evidencing ownership of shares in a limited liability corporation. Thus the concept of a security began to include certain types of both debt and ownership interests in organized businesses.

In the twentieth century, the concept of a security was made more precise for legal and regulatory purposes, for example, in one embodiment, in the federal securities law of the United States. That embodiment of the concept is essentially equivalent to the following narrow definition of a security (1) an ownership interest in the debt or equity, or some combination thereof, of a firm (e.g., a business entity or enterprise) or special purpose entity (SPE), said ownership interest not per se including an obligation or right to participate in any business or management activity of said firm or SPE, or (2) an ownership interest in debt of a governmental entity. As interpreted in law, the definition of "security" encompasses investment contracts as well as stock warrants and other rights to subscribe to or purchase any of several types of securities from a firm or SPE.

This is essentially as far as the narrow definition of a security extends. However, the financial industry has informally expanded the concept of a security to include other types of exchange-tradable interests in property, including so-called derivative securities such as options and futures. Such financial instruments are regarded as securities for some purposes by investment regulators and financial industry professionals, although this does not apply in the U.S. for statutory or regulatory purposes. For example, a key difference that distinguishes warrants from other tradable call options from the perspectives of both the narrow definition of a security and the U.S. legal and regulatory concept of a security is that warrants raise investment funds for the issuing firm in connection with issuance of the warrants and raise additional investment funds for the firm if exercised, whereas other tradable call options do not raise investment funds for the issuing entity in connection with issuance of the options and do not raise investment funds for the firm if the options are exercised.

The narrow definition of a security is the appropriate definition for purposes of certain embodiments herein. It follows that a security is comprised of an actual or potential financial obligation, for example, a debt or ownership interest, of a legal entity organized to conduct a business enterprise or governmental venture or to conserve or hold one or more assets reasonably expected in totality to generate a profit, such that investment funds are raised for the entity in connection with the creation of the obligation. Accordingly, a security involves an actual or potential financial obligation issued by a legal entity other than one or more natural persons, e.g., debt or equity in a corporation or SPE.

Special Purpose Entities in Securitization

For purposes of some embodiments herein, when one or more interests in property are securitized via the creation of a SPE to conserve or hold the one or more interests in property, an interest in the one or more interests in property and an interest in the securitized one or more interests in property are intended to refer to a corresponding interest in the SPE.

Direct ownership of an asset comprised of one or more interests in property could expose an owner to potentially unlimited legal liability as a result of events involving the asset. For example, this could occur in the case of both tangible property and intangible property, e.g., real estate, airplanes, mortgages and consumer loans. Securitization of the asset by creation of a SPE to conserve or hold the asset frequently converts the asset into a limited liability asset, which can enhance the value of the asset.

Any incremental tax liability created by the existence of the SPE could affect the investment returns that the asset is expected to generate for investors, possibly resulting in a reduction in the market value of the securitized asset. For example, in the case of the United States, the loss of value is usually most significant in the case of any incremental federal tax liabilities, since federal tax rates are usually higher than corresponding state and local taxes in the case of the more potentially significant taxes, e.g., income taxes.

Accordingly, an embodiment of a SPE for purposes of asset securitization is a SPE that incurs essentially as little incremental tax liability as reasonably possible. For example, in the case of the United. States, this suggests an entity that incurs essentially no incremental income tax liability, at least at the federal tax level. A pass-through entity for United States federal tax purposes is an example of such an entity, since it is essentially invisible to federal authorities for federal tax purposes, e.g., a grantor trust, a limited liability company, a limited liability partnership, a limited partnership, and a real estate mortgage investment conduit (REMIC).

Since a SPE that is created to conserve or hold an asset is not expected to retain significant amounts of income, another embodiment of a SPE for purposes of securitization in the United States is a SPE that is allowed an income tax deduction for income distributions to holders of equity interests in the entity, at least at the federal tax level; for example, a SPE that is organized as a real estate investment trust.

In the case, for example, of SPEs that are organized as limited partnerships or limited liability partnerships, usually only the part of asset equity that is represented by marketable limited liability partnership interests is actually securitized. However, this usually amounts to at least eighty percent of the equity in the SPE, and frequently amounts to as much as ninety-nine percent or more.

In an embodiment, the SPE is bankruptcy remote, or possibly sometimes even bankruptcy immune. However, a bankruptcy remote SPE may not be feasible in all cases. For example, the essential elimination of bankruptcy risk from the SPE capital structure may be infeasible within the securitization cost constraints.

Although the SPE in a securitization process is usually established for a specific securitization, there can be cases in which a single SPE is established to accommodate a series of securitizations. For example, this could occur in order to avoid duplicative costs associated with creating a series of SPEs in situations wherein the appropriate investment characteristic modifications can be accomplished at lower cost with fewer entities.

There can be cases in which there is an entity for an equity interest in a securitized asset that has no material effect on the investment characteristics of the securitized asset. For example, in the case of stock, nominal ownership of the equity interest can be held by an investor's brokerage firm, or the stock can be held in the form of American Depository Receipts in the case of shares whose registered ownership resides offshore, with essentially no impact from an investment perspective on the investment characteristics of the stock.

In this way, there can be a concatenated sequence of entities for a securitized asset. However, such a concatenated sequence can be regarded for purposes of some embodiments herein as a single entity.

Economics of Securitization

The sale of assets is a way for businesses to raise capital that is less risky than borrowing and frequently is also less costly. Securitization is financial technology that selectively alters the investment characteristics of assets to make them more attractive to buyers. Accordingly, securitization is capital funding technology for businesses and governmental entities.

For example, securitization enables lending institutions to recycle their operating capital by selling loans. A process closely akin to securitization enables farmers to alter their capital structure at low cost by preselling future output. Securitization also enables firms to raise business capital by selling ownership interests in themselves.

The microeconomic issue in securitization is whether the seller would be better off selling the unsecuritized asset or a securitized version of the asset. The answer depends upon three amounts: the change in market valuation generated by securitization, the cost of implementing the securitization, and the present value of the future cost of maintaining the securitization structure. The net effect can be determined in two stages: the effect on asset value in the absence of the securitization costs, and the incremental effect due to the costs.

The market valuation of the asset both before and after securitization is the price equilibrium between the supply and demand curves for fungible investment interests in the asset. In this context, price refers to the transaction price between buyers and sellers. However, the net sale price is the seller inducement that actually determines the supply curve, and the supply curve represents the seller inducement plus seller transaction costs. Similarly, the gross purchase price is the price hurdle that actually determines the demand curve, and the demand curve represents the price hurdle minus buyer transaction costs.

The effect of securitization on asset valuation is determined by its effect on the supply and demand curves. Since the supply curve is determined by capital funding considerations, it is inelastic. It follows that the supply curve is a vertical line. Accordingly, the supply curve is unaffected by securitization. For example, the objective could be to recycle the capital used to create the asset, which could be a pool of mortgages. In this case, the supply curve represents the entire supply of the asset.

The demand curve is affected as follows: the reduction in illiquidity and liability exposure leaves previously existing interest among potential investors unreduced, since reductions in illiquidity and liability exposure cannot diminish investor interest if the other investment characteristics remain materially unaffected for purposes of investment. In addition, if there is elasticity in the demand curve, then reduced illiquidity and liability exposure generates incremental demand among previously uninterested investors by reducing the buyer price hurdle.

There must be positive elasticity in the expected demand function for the asset, since otherwise there is no expected price benefit to justify the cost of securitization. Positive elasticity of demand is sufficient to ensure that costless securitization generates incremental demand. Positive elasticity also ensures that there is at most one price equilibrium. This raises the demand curve.

Asset value is the price that equilibrates supply and demand. Since securitization leaves the supply curve unchanged and raises the demand curve, the following result is established:

Proposition. Assume that securitization does not affect the supply curve for an asset, and that there is elasticity in the demand curve for the asset Then costless securitization increases the market valuation of the asset.

Accordingly, if the expected increase in valuation due to securitization exceeds the cost of implementing the securitization plus the present value of the future cost of maintaining the structure, then securitization is expected to be a value-creating process.

The Law of Demand implies that there is negative elasticity at every point in the demand curves of essentially all assets. Although exceptions to this rule may exist under some circumstances, e.g., Giffen goods and Veblen goods, the known potential exceptions are consumer products and are unlikely to occur in the investment domain.

If the asset supply is elastic with respect to price, then securitization changes the supply curve as well as the demand curve. In this case, the effect of securitization on market price becomes more complicated. For example, if securitization reduces transaction costs for potential sellers, then securitization reduces the transaction price needed to generate the seller inducement. This lowers the supply curve; which could reduce the market price.

In the case of initial public offerings (IPOs), individuals with shares and options on shares prior to the IPO frequently commit not to sell any of the shares for several months after the IPO. This reduces the risk that the unseasoned secondary market for the new offering could be depressed by the supply elasticity of the pre-IPO shares.

A qualitative observation about the costs suggests additional conclusions about securitization. It suffices to note in this regard that some cost components are fixed and that the variable components increase less rapidly than the value of the asset. This implies that economies of scale and diseconomies of small scale are considerations in determining which—if any—securitization methodologies are viable in each situation.

For example, residential mortgages that qualify for default insurance from any of the mortgage conduit government-sponsored enterprises (GSEs) are too small for securitization of the individual mortgages to be economically viable. Accordingly, consolidation of the assets into pools of mortgages is inevitable in any securitization methodology for these assets.

This raises the question of the impact of pooling on asset value. In general, the impact is complicated in the case of illiquid assets and heterogeneous investor demand, although several cases of this will be discussed. However, in one case the impact is simple: the pooling of assets with homogeneous investment characteristics into a new asset with the same investment characteristics as the individual pooled assets. In this case, the aggregate demand for assets with essentially the same investment characteristics as the individual assets in the pool is unreduced by consolidation of the assets into the pool. Accordingly, the value of the new asset is at least as much as the sum of the values of the component assets.

The creation of a secondary market for residential mortgages via MBS is the canonical example of securitization that involves asset pooling. Ranieri estimates that creation of the secondary market reduced the average cost of home mortgages in the U.S. by two hundred basis points. The reduction in mortgage interest rates in turn triggered the recent rises in demand for home ownership, contributed to the dramatic expansion of the U.S. economy over the last fifteen years, and fueled a housing boom that has significantly increased the net worth of many millions of homeowners.

This section relates the impact of securitization on investment characteristics to the impact of the process on value. The constraint that the process only impact the investment characteristics through reductions in illiquidity and liability exposure implies that securitization creates value before implementation costs are considered. Asset transformations that violate this constraint do not necessarily preserve asset value, even if they are costless.

Securitizable Assets

Major portions of several asset classes have been securitized by the financial industry. The securitization methodologies vary for different asset classes, but the economic rationale for the variations frequently becomes apparent once differences between the investment characteristics of the assets are taken into account. Three broadly defined asset classes in which securitization has had a role in developing secondary markets are fixed-income assets, tangible assets, and firms. These asset classes are distinct, with each class possessing signature investment characteristics not associated with the other two classes.

Fixed-Income Assets

Fixed-income assets are financial obligations characterized by the specification of the following: the identity of an obligor; one or more payments for specified positive amounts to be transferred from the obligor to the asset holder by corresponding specified dates; and recourse of the asset holder in event of payment default to specified property rights of the obligor that are intended when the obligation is created to be comparable in value to the obligation value during the life of the obligation. The obligation is discharged once all payments have been made as specified or, in event of default, once the default recourse has been resolved.

Most of the specifications that characterize a fixed-income obligation are defined for legal and investment purposes in the defining document for the obligation, although some—such as default recourse—may be specified in whole or in part by the legal statutes that relate to various types of financial obligations. For example, in the United States, federal bankruptcy law specifies lessor default recourse in event of lessee bankruptcy.

The investment characteristics of fixed-income assets differ from the investment characteristics of most tangible assets and firms in that fee simple ownership of tangible assets and firms includes residual equity rights. There is no guarantee that residual equity rights will generate any specified level of investment income, and there is no default recourse to alternative property rights if the investment income fails to reach expected benchmarks.

Fixed-income assets can be either intangible property or tangible property, or a mix of both intangible and tangible property. For example, fixed-income assets that are comprised of debt are intangible property, whereas fixed-income assets that are comprised of one or more vested term of year ownership interests in leased tangible property are themselves tangible property. Short-term receivables are intangible property that are regarded as tangible assets for accounting purposes, but not for purposes herein.

Fixed-income assets in the U.S. are comprised primarily of government debt, corporate debt and mortgage debt. Market-based valuations of fixed-income obligations depend on several quantifiable systematic risk factors, including the following: the risk-free benchmark yield curve, default risk, average life, default recourse, prepayment risk and relative liquidity. For example, the relevant default recourse attribute for purposes of fixed-income pricing is the expected loss in event of default, which is quantifiable via modeling. Prepayment risk can also be quantified by modeling.

Most fixed-income investment risk is systematic when the obligations are incurred (this does not apply to lower grades of high yield corporate debt, which resemble corporate equity more than debt for investment analysis purposes). However, in many cases the proportion of investment risk that is systematic declines as time passes due to the absence of information updates on the risk factors. For example, mortgagor credit report updates and collateral valuation updates are unavailable in the cases of most residential mortgages and many commercial mortgage loans to private borrowers.

Tangible Assets

The legal description of tangible property is the definition of a tangible asset for purposes of some embodiments herein: property that has physical form and substance and is not intangible; that which may be felt or touched, and is necessarily corporeal. Accordingly, the expressions tangible asset and tangible property are equivalent in this discussion.

Tangible assets can be grouped according to various broad physical attributes: real property or personal property; durable, storable or perishable; consumable, recyclable or reusable; commodity or distinctive. These attributes are of varying significance to investment characteristics. For example, consumable and recyclable assets are usable by owners only once, since users do not retain residual equity in recycled resources derived from used assets. Accordingly, owners of consumable and recyclable tangible assets have the same three investment alternatives available at every point in time: sell the asset; store the asset for future use subject to perishability constraints; or consume the asset by using it. By contrast, owners of reusable assets have other investment alternatives: sell the asset; store the asset for future use; use the asset without sacrificing the potential for further use; or rent the asset to another user.

The storage of reusable assets is usually an inefficient investment tactic if there is demand interest for use of the assets from potential renters. Accordingly, the efficient alternative for investors who do not acquire reusable assets for their own use is to generate investment income by renting the assets.

In the case of most rentable assets, significant cost is involved from the investor perspective in switching renters and from the renter perspective in switching assets. In such cases, owners and renters usually seek to minimize their respective future costs by negotiating leases. The leases encumber lessor rights to control the assets for specified time intervals by transferring selective rights to asset use to the lessees in return for specified rental payments.

The market value of an unleased reusable tangible asset is the present value of the rights to future asset use. Accordingly, the execution of the lease reduces the investment risk exposure of the asset holder to the tangible asset market in the same way that laying off bets lowers bookie risk exposure to the outcome of wagers. If the market value of rights to future asset use rises, then lessees capture part of the rise in market value by using the asset and paying below-market rent. Conversely, if the market value of rights to future asset use falls, then lessees absorb part of the decline in asset value by paying above-market rent for asset use until their leases expire. Since a portfolio of leases is a fixed-income asset, these considerations establish the following results:

Lemma 1. For investment analysis purposes, a leased asset is the sum of a fixed-income asset and future ownership of the unencumbered asset.

Lemma 2. Leasing changes the investment characteristics of tangible assets by reducing the exposure of investors to investment risk in the tangible asset market and increasing the exposure of investors to investment risk in the fixed-income market.

It follows that the investment characteristics of individual leased assets differ materially when the proportions of their investment value represented by the leases differ materially, even if the assets have the same investment characteristics when unencumbered by leases. Accordingly, the investment characteristics of leased tangible assets are more complex than the investment characteristics of consumable, recyclable, and unencumbered reusable tangible assets.

Real Assets

For legal purposes, property is classified as either real property or personal property. The difference is related to the concept of a location for the property: real property and is immobile and has an essentially permanent location, whereas personal property is mobile and cannot be assumed to have a permanent location. Real property is associated with land. For purposes of this discussion, the expressions real asset and real property are equivalent. For some purposes herein, a real asset can be a tangible asset.

In an embodiment, a real asset is deeded. Deeded real assets are examples of deeded assets but, as discussed below, many personal assets can also be deeded. A deed to an asset conveys a fee interest in the asset, e.g., an ownership interest in the asset that is or may become possessory. In short, a deeded interest in an asset is a fee interest in the asset, a fee interest in an asset is an ownership interest in the asset, and an ownership interest in the asset is an equity interest in the asset. Accordingly, a deeded interest in an asset is an equity interest in the asset. Similarly, a fee interest in an asset is an equity interest in the asset.

Commercial real estate, residential real estate and farmland are examples of real assets, and there are others. For example, a deeded mineral right is a real asset and a deeded water right is a real asset. In these cases, the deeded asset is a fee interest in a real asset, e.g., land that can either include or not include a fee interest in surface land. In one embodiment, a deeded mineral right does not include a fee interest in surface land. In another embodiment, a deeded water right does not include a fee interest in surface land.

The property rights associated with a deeded asset can be conveyed by one or more deeds. It follows that a pool of deeded assets is a deeded asset, e.g., a pool of deeded real assets is a deeded real asset, a pool of deeded tangible assets is a deeded tangible asset, and a pool of deeded intangible assets is a deeded intangible asset.

An asset is a bundle of property rights that has value. A fee simple interest in an asset represents ownership of the bundle of property rights defined by the asset. A fee interest in the asset other than a fee simple interest in the asset represents ownership of a subbundle of the bundle of property rights defined by the asset.

A component of an asset is a subbundle of the bundle of property rights defined by the asset. Accordingly, a fee interest in an asset other than a fee simple interest in the asset represents ownership of a component of the asset. A component of an asset that has value is an asset.

Financial applications can involve qualified fee interests in assets. A primary qualified fee interest in an asset is a fee interest in the asset that terminates upon an occurrence or nonoccurrence of some specified event or combination of events. A secondary qualified fee interest is a fee interest that commences upon an occurrence or nonoccurrence of some specified event or combination of events. A qualified fee interest is a fee interest that is either a primary qualified fee interest or a secondary qualified fee interest. A qualified fee interest can be either vested or conditional. A deeded fee interest, e.g., a deeded qualified fee interest, is a fee interest in which the associated property rights are defined by at least one deed. Examples of a primary qualified fee interest include a term of years interest and an augmented term of years interest. Examples of a secondary qualified term of years interest include a remainder interest and a complementary remainder interest. A deeded augmented term of years interest is an example of a deeded qualified fee interest in which the associated property rights can be defined by one deed or two deeds.

A deeded component of an asset can be defined by a deeded qualified fee interest in the asset in the case of both real and personal assets. A deeded qualified fee interest in a real asset can be a real asset or a personal asset, depending on whether the property represented by the qualified fee interest is immobile or mobile. A deeded qualified fee interest in a personal asset is a personal asset, and a deeded qualified fee interest in a tangible asset is a tangible asset.

A pool of deeded mineral rights is a deeded real asset consisting essentially of (or consisting of—depending on the embodiment) deeded mineral rights. Similarly, a pool of deeded water rights is a deeded real asset consisting essentially of (or consisting of—depending on the embodiment) deeded water rights. A deeded interest in mineral rights is a real asset. For example, a deeded qualified fee interest in at least one mineral right is a real asset. Similarly, a deeded interest in water rights is a real asset. For example, a deeded qualified fee interest in at least one water right is a real asset.

Deeded mineral rights reflect a deed to a fee interest in at least one mineral right in a real asset. Deeded mineral rights can also reflect more than one deed, wherein each said deed is a deed to a fee interest in at least one mineral right in a real asset. Similarly, deeded water rights reflect a deed to a fee interest in at least one water right in a real asset. Deeded water rights can also reflect more than one deed, wherein each said deed is a deed to a fee interest in at least one water right in a real asset. More generally, a deeded interest in an asset, e.g., a real asset or a personal asset, reflects at least one deed, wherein each said deed is a deed to a fee interest in the asset. For example, the interest can be a component of the asset, e.g., a component defined by a qualified fee interest in the asset.

Another example of a real asset is a timber right, e.g., a right to cut and remove timber from specified real property. Still another example of a real asset is an air right, e.g., ownership of space above specified real estate. Both timber rights and air rights are immobile assets. Accordingly, a deeded timber right is a real asset, and a deeded air right is a real asset.

Mobile Air Rights

A mobile air right is a property right that can be created by a governmental authority. A mobile air right conveys to its owner an exemption at least one regulatory restriction on real estate improvements in a specific volume of space above unspecified real estate. In an embodiment, the right includes an exemption from at least one zoning restriction. In different embodiments, the right may include or not include a restriction on the space, e.g., a height limit on improvements. A height limit may be specified either in absolute terms, e.g., with respect to the ground, or in relative terms, e.g., with respect to a zoning restriction or multiple zoning restrictions.

In contrast to real air rights, a mobile air right is a personal asset. In order to implement the right, the mobile air right owner specifies the real estate, subject to any restrictions included in the right. This is a one-time specification and converts the mobile air right into an immobile asset. For example, the mobile air right can be attached to a real estate parcel. Accordingly, a mobile air right is usually a consumable asset: following an instance of use, it is immobile. In one embodiment, the air right can only be used to support one set of real estate improvements. In another embodiment, the air right can be reused, although only above the real estate previously specified by the owner. In still another embodiment, the air right can be reused and becomes mobile again once the improvements are removed from the space to which the air right was affixed. In this embodiment, the air right is a reusable asset.

In some embodiments, the addition of improvements to space designated by the owner a mobile air right for use of the air right must commence within a prespecified amount of time following the designation. In some of these embodiments, the improvements must also be completed within a prespecified amount of time following the designation. In some of these embodiments, some of the improvements must be completed within a prespecified amount of time following the designation.

In other embodiments, there are no time restrictions on the mobile air right with regard to the amount of time allowed for construction of improvements in space designated for use of the mobile air right to commence. However, in some of these embodiments, a change of governmental restrictions with regard to construction within the designated space before the commencement or completion of construction can supersede the regulatory exemption represented by the mobile air right. In other of these embodiments, the exemption conveyed by the mobile air right is absolute and cannot be superseded by subsequent regulatory changes once a space intended for use of the mobile right has been designated.

In one embodiment, a mobile air right can only be used within the jurisdiction of the governmental authority that issues the air right. In other embodiments, a group of governmental authorities with different regional jurisdictions cooperate in jointly recognizing mobile air rights issued by individual members of the group. In this case, a mobile air right issued by any member of the group can be used throughout the combined jurisdiction of the members of the group.

A mobile air right in combination with a deeded fee interest to space above a real estate parcel can expand the right of the deeded fee interest owner to add real estate improvements in the space. However, a mobile air right alone does not convey a right to add improvements in a volume of space, only an exemption from one or more governmental restrictions on development of the space.

Mobile air rights can be issued to resolve problems that arise in connection with governmental regulation of real estate development that otherwise could involve lengthy and expensive litigation. For example, a commercial building with an unutilized air right is located in a residential area. The municipal government and the local residents strongly object to any attempt by the building owner to extend the building upward, but zoning regulations permit an upward extension and it is infeasible to modify the regulations to prevent the extension. In such a case, the building owner could view any opposition to an upward extension as a taking of an air right attached to the building that is entitled to compensation.

Under current conditions, the only conventional way for the building owner to realize the value of the air right is to attempt to construct an upward extension. The attempt is certain to be time-consuming and expensive, might not be successful, might lead to time-consuming and expensive litigation, and might not result in any financial compensation. In short, the attempt might be a financial debacle.

Another way for the building owner to realize the value of the air right is by converting it into a mobile air right. For example, the owner can offer the municipal government to exchange the unutilized real air right associated with the building for a mobile air right, e.g., to exchange the unutilized space above the building for an equivalent or corresponding volume of mobile space. If the government agrees, then the building owner acquires a generic air right that could be viewed for investment purposes as a consumable tangible asset. The building owner can store the asset as an investment in air rights value, use it immediately or later to support construction of an upward extension to a building at another location, or sell it to another investor or real estate owner.

In one embodiment, the owner converts an unutilized volume of air space associated with deeded real property into a corresponding volume defined by at least one mobile air right, wherein the corresponding volume is determined by a predetermined rule or formula of the issuing governmental authority. For example, one example of a formula is to issue at least one mobile air right to the same volume of space that the owner detaches from the real property, although other formulas and rules can be applicable. In another embodiment, the governmental authority and the real property owner negotiate the volume of space associated with the at least one mobile air right that is issued in return for the detachment of at least one air right from real property. In still another embodiment, a fee is imposed by the governmental authority as part of the conversion.

An organized market for mobile air rights can provide real estate owners with a market to value the unutilized air rights associated with their property. It can also provide real estate owners with a way to realize value from a component of their real property that has intrinsic value in cases in which there is no other mechanism for real estate owners to extract any wealth.

Mobile air rights can be issued by governmental authorities in units that can be unbundled, wherein each unit conveys mobile air rights to a specified volume of mobile space. Such units are fungible mobile air rights. An organized market for the units, for example, on an organized exchange, e.g., a commodity exchange or a private financial exchange, can allow the marketplace to create rapid and low-cost solutions to zoning-related questions that now consume large amounts of municipal administrative time and money.

Firms

It was established above that firms have investment characteristics that differ from the characteristics of fixed-income assets. In addition, firms are business organizations, which are distinct from tangible assets. The assets of the firm extend beyond tangible assets to include intangible sources of value such as organizational structure, intellectual property, client relationships, and the business experience and proprietary expertise of its skilled personnel. For example, shares in Exxon represent an ownership interest in a securitized oil business, not an ownership interest in securitized petroleum. Similarly, shares in Anglo-American Corporation represent an ownership interest in a securitized gold mining business, not an ownership interest in securitized gold bullion.

The differences that distinguish firms from tangible assets such as oil or gold bullion are evident and include the following: (1) a firm has a business strategy, a tangible asset does not; (2) a firm has an investment strategy, a tangible asset does not; (3) a firm can respond to change in the market for a tangible asset (oil in the case of Exxon, gold in the case of Anglo-American) by changing its business and investment strategies, a tangible asset cannot; (4) a firm can make tactical mistakes in operations, a tangible asset cannot.

These differences imply corresponding differences between the respective investment characteristics of, firms and tangible assets. In particular, it implies differences between the following: shares in Exxon and marketable ownership certificates for stored petroleum; shares in Anglo-American and marketable ownership certificates for warehoused gold bullion.

This is not meant to deny the significance of the relation between conditions in the markets for tangible assets and prices of corporations in companies that produce and market products based on those tangible assets. For example, it is evident that the business prospects of Exxon are highly correlated with conditions in the spot market for oil, just as the business prospects of Anglo-American are highly correlated with conditions in the market for gold bullion. Accordingly, investors can implement indirect investment strategies based on their expectations concerning future conditions in the oil and gold markets respectively by investing in shares of oil companies such as Exxon and gold mining companies such as Anglo-American.

However, the investment characteristics of such companies also include exposure to business risk factors that have little or nothing to do with conditions in the markets for tangible assets. For example, Enron was an energy company that focused on the natural gas sector of the energy industry, but the investment characteristics of shares in its corporate debt and equity after mid-2001 were determined by business factors that were essentially uncorrelated with the market for natural gas.

Analogous examples emerged recently in the residential real estate finance industry. In recent years the government-sponsored enterprises (GSEs) Fannie Mae and Freddie Mac have been the largest and most prominent publicly traded firms in the business of investing in residential real estate mortgages. However, from 2002 through 2005 the prices of shares in these GSEs were driven downward by factors related to management problems and tactical mistakes in operations rather than to conditions in the market for residential real estate debt.

Firm-like Characteristics in Tangible Assets

The difference between reusable tangible assets and firms becomes smaller at certain times. In particular, when it is time to consider re-leasing a reusable tangible asset, decisions must be made by or on behalf of asset owners concerning the investment characteristics of prospective new leases.

If the owners are passive investors, then it follows that the tangible asset must sporadically include a limited scope business strategy for re-leasing as part of its investment characteristics. In many cases, the business strategy disappears from the significant investment characteristics of the asset once re-leasing is concluded.

This does not imply that reusable tangible assets are equivalent to firms. For example, firms have unrestricted investment strategies that respond to changes in the marketplace. By contrast, the primary investment strategy for reusable assets is to maintain the physical asset. This strategy is restricted and largely independent of events in the marketplace. Furthermore, leases frequently transfer control over implementation of the strategy to the lessees.

This also does not imply that frequent re-leasing necessarily makes reusable assets more like firms. For example, large apartment buildings re-lease almost continuously, but usually restrict their operating strategies to selection of credit benchmarks for tenants and standardized leases in which the only items to be negotiated are monthly rent and lease term. Accordingly, some business strategy is a necessary feature of apartment building investment characteristics, but the necessary strategy is more restrictive than most re-leasing strategies for commercial real estate. It follows that the strategy could be regarded as part of the economic geographical location or position of the asset rather than as a business strategy in the usual sense of firms.

Fixed-Income Securitization

One investment characteristic that distinguishes many forms of illiquid creditworthy debt from the bonds of governments and publicly traded companies is the absence of information updates on the systematic risk factors used by the fixed-income marketplace to price the debt. For example, mortgagor credit report updates and collateral valuation updates are unavailable in the cases of residential mortgages and many commercial mortgage loans to private borrowers.

In the case of residential mortgages, requirements for such updates would constitute both an unwelcome invasion of privacy and a diseconomy of small scale that increases the cost of borrowing to an unacceptable extent. Absence of such updates is also a factor in pricing loans to some commercial entities where diseconomy of small scale is not an issue. For example, the 1991 bankruptcy of the private real estate investment firm Olympia and York and the low market value of collateral supporting the firm's commercial debt were surprises to the firm's lenders and to the financial community in general.

The absence of information updates on the systematic risk factors leads to steadily increasing idiosyncratic investment risk with the passage of time. This results in a steady decline over time in the proportion of investment risk that is systematic.

Although some decline in the proportion of systematic risk is unavoidable, the magnitude of the decline can be reduced in many situations by pooling fixed-income assets with similar systematic risk characteristics and similar amounts of total investment risk. This creates a new fixed-income asset with similar initial systematic risk to the individual pool components and a more stable proportion of systematic investment risk over time.

Asset pooling represents a way in many cases to circumvent the steadily increasing idiosyncratic risk in the absence of information updates while preserving the signature investment characteristics of the pooled assets. It follows that asset pooling is useful in many fixed-income securitizations.

The universe of fixed-income assets is closed under consolidation by pooling, and the systematic risk factors of the new asset can be determined with varying degrees of difficulty from the systematic risk factors of the component assets. This determination is simpler if the component assets have essentially homogeneous systematic risk characteristics, as in the case of many residential mortgage pools created by the GSEs.

For example, the pooling of fixed-income assets with relatively homogeneous systematic risk factors, origination dates and originators, such as residential mortgages, can generate a new fixed-income asset with essentially the same systematic risk factors as the individual pool components and lower securitization costs than would be involved in separately securitizing the components. For investment analysis purposes, homogeneity of origination dates and originators is a practical proxy for homogeneous initial levels of idiosyncratic risk. The GSEs nurtured the development of the secondary residential mortgage market by successfully promulgating the standardization of home loan documentation and covenants when the secondary market began to emerge.

Diversification via pooling reduces the amount of any decline in the proportion of systematic investment risk over the life of the asset. In the case of residential mortgages, pooling also materially reduces the idiosyncratic component of prepayment risk. Prepayment risk is a combination of systematic and idiosyncratic risk: systematic risk due to borrower refinancing opportunities that result from changing interest rates and idiosyncratic risk due to borrower refinancings necessitated by changing individual circumstances such as homeowner relocations.

Relative homogeneity of systematic risk across the individual residential mortgages of many pools suggests that the market perceives investment interests in the pools prior to securitization as equivalent or preferable to investment interests in the individual mortgages, i.e., pooling homogeneous home mortgages does not lower aggregate demand for the mortgages. Accordingly, although it is the mortgage pools that are securitized rather than the individual mortgages in the pools, the securitization of pools of essentially homogeneous residential mortgages accomplishes essentially the same objectives as the securitization of the individual mortgages, which otherwise is probably infeasible. On the other hand, the benefits of securitization via pooling become less certain and less stable over time as risk inhomogeneities increase across the assets selected for the pool.

In the simplest case, a securitized pool has one capital class and one class of shares for that capital class. In this case, the shares are fungible and are referred to as pass throughs or pass-through securities. In the case of a securitized pool of mortgages, the shares are known as pass-through mortgage-backed securities, e.g., pass-through residential MBS.

The fixed-income universe is closed under the creation of tranches in pools of fixed-income assets. The economic rationale for tranching pools, aka 'slicing and dicing,' is to repackage much of the economic value of the pooled assets in securities with less (and simpler) prepayment risk and/or default risk than shares in the entire pool. The objective can be to increase in overall demand for investment interests in the pool such as, for example, equity interests, by expanding the investor clientele for the senior interests without a corresponding reduction in the investor clientele for the remaining interests.

The extent to which tranching accomplishes this objective in general is uncertain. Although some simple tranche designs have experienced persistent market acceptance, some complicated designs have lost viability as the clientele for the most subordinated tranches achieved greater understanding of the investment risk associated with the interests and repriced the tranches accordingly.

As with securitization in general, the key to successful tranching is to predict the overall impact on incremental demand. This is easier to do with tranches that have similar investment characteristics to securities for which a well-defined clientele already exists.

Commercial real estate mortgages are frequently securitized by pooling and tranching in the same way as residential mortgages and for analogous reasons. Although the individual mortgages are frequently large enough to support marketable pass-through securities without any need for pooling, loan investors suffer from the same deficiency of information updates on the collateral that is a feature of residential mortgages. Since the only default recourse of mortgage investors is normally to the collateral, the absence of collateral valuation updates alone constitutes a potential concern for secondary mortgage market participants that highlights the role of securitization methodologies that involve pooling. On the other hand, prepayment risk is usually less significant than in the case of residential mortgages due to the frequency of loan provisions that impose prepayment penalties and lockouts. Mortgage investors also suffer from an absence of credit report updates in the case of private borrowers.

The positive impact of commercial mortgage pooling on market value is not as inevitable as in the case of residential mortgages because the loan investment characteristics are more heterogeneous. For example, commercial real estate mortgage covenants and documents have proven more resistant to standardization than in the case of residential real estate mortgages, due largely to differences between the financial resources that support debt service of residential and commercial mortgages. The income stream of the borrower is the primary resource in the case of residential mortgages, whereas the income stream of the mortgaged property is the primary resource in the case of commercial mortgages.

Mortgagors of commercial property rationally seek to reduce the default risk that arises from uncertainty in the income stream generated by the property. Accordingly, borrowers seek customized covenants to minimize their default exposure due to idiosyncracies in the income stream by passing the idiosyncratic risk through to the lender.

The real estate income stream has idiosyncracies because tenants request customized lease provisions in response to idiosyncracies in tenant business activity that generate lease default risk that could be passed through to the landlord. Thus the driving economic force behind borrower resistance to commercial mortgage standardization is the idiosyncratic risk component of tenant business activity, which is unlikely to diminish in the future.

Commercial real estate mortgage loan quality depends as much on leases and lessee credit as on the location and physical characteristics of the property and the credit of the property owner. It follows that pooling necessarily involves loans with less similar investment characteristics than in the case of residential loans: in particular, less similar credit quality, maturity, default protection and origination dates. Since tranching is not certain to add value in general, it is reasonable to expect the securitization of commercial mortgages to be a more complex and dicey process than in the case of residential mortgages. Nonetheless, the market for commercial mortgage-backed securities (CMBS) has experienced strong growth in recent years.

Mortgages on personal small aircraft usually suffer from diseconomies of small scale and information update deficiencies for secondary investment market purposes, for example, absence of collateral valuation updates and absence of mortgagor credit updates. The aircraft, usually owned by one or more natural persons and usually operated by pilots not licensed to operate aircraft for hire, for example, one or more of the owners, are operated essentially for noncommercial purposes, for example, personal transportation or enjoyment. The pilots usually have some form of noncommercial pilot license, for example, a private pilot license; for example, in the United States, wherein a license is also known as a certificate, a private pilot certificate; other examples of noncommercial pilot licenses in the United States are sport pilot certificates and recreational pilot certificates. Thus no widespread business motives exist among personal small aircraft owners to oppose the standardization of mortgages on the aircraft. Accordingly, the securitization of pooled mortgages on personal small aircraft is a viable securitization methodology. In another embodiment, the personal-small-aircraft mortgages have relatively homogeneous systematic risk and standardized loan documentation and covenants.

The entire mortgage on a personal small aircraft may be sold for securitization by the loan originator or a minority ownership interest in the mortgage may be retained by the loan originator. Accordingly, the individual components in each pool of interests in personal small aircraft mortgages can include either individual mortgages or partial ownership interests in individual mortgages or both individual mortgages and partial ownership interests in individual mortgages. In any case, each pool includes ownership interests in many different aircraft with many different owners: for example, at least fifty different aircraft, almost always at least one hundred different aircraft, usually at least two hundred different aircraft, frequently at least five hundred different aircraft, and in some cases at least one thousand different aircraft.

Other types of assets than mortgages on personal small aircraft can in some cases be included in the pool, but the entire pool by value consists essentially of fixed-income assets. In an embodiment, at least half of the pool by value consists of individual mortgages on personal small aircraft and partial ownership interests in individual mortgages on personal small aircraft, and frequently the entire asset pool by value consists essentially of (or consists of—depending on the embodiment) such interests in mortgages on personal small aircraft.

A personal small aircraft can be any of several types of personal small aircraft. For example, a personal small aircraft can be a flying car or a roadable aircraft, wherein said personal small aircraft can be either a jet aircraft or a propeller driven aircraft. A personal small aircraft can also be a light sport aircraft, an ultralight aircraft, or a microlight aircraft. In one embodiment, at least half of the interests in mortgages on personal small aircraft in the pool by value are mortgages on a type of personal small aircraft, and frequently essentially all of the pooled interests by value in mortgages on personal small aircraft are comprised of interests in mortgages on a type of personal small aircraft.

Unlike residential real estate mortgages, government debt and corporate debt of publicly traded corporations is not usually pooled prior to securitization into bonds, in large part because quarterly and annual balance sheet and income statement disclosures required by federal and state law from governments and by the Securities and Exchange Commission (SEC) from publicly traded companies normally provide the periodic information updates needed to maintain the systematic portion of bond investment risk at an adequate level. Furthermore, pooling does not contribute significantly to prepayment risk reduction or simplification, because government and corporate bond prepayment risk is already small and relatively simple to model. In particular, the idiosyncratic component of prepayment risk is usually small to nonexistent, and interest rate-based systematic refinancing opportunities are exercised far less frequently by government and corporate borrowers than by residential mortgagors because these borrowers usually access the debt markets throughout the economic cycle. This implies that their cost of debt is an average of interest rates across the economic cycle rather than one or two interest rate values from a single part of the cycle, which lessens their incentive to refinance at every interest rate-driven opportunity.

Similar considerations apply to the securitization of bondable net leases of equipment and single-tenant real estate. In cases in which the market value of a lease is large enough to justify the cost of stand-alone securitization, the lease can be bundled with selected ownership rights in the leased property to form a securitized fixed-income obligation with investment characteristics that closely resemble unsubordinated secured debt of the lessee. In addition, there is usually no prepayment risk associated with the asset, since the financial obligation is lease-based.

Accordingly, in the case of government and publicly traded corporate lessees with sufficiently high credit ratings, e.g., investment-grade, quarterly and annual balance sheet and income statement disclosures provide the periodic information updates needed to prevent the systematic portion of investment risk from declining significantly. Thus the asset investment characteristics suggest the absence of any economic advantage to securitization methodologies that feature asset pooling prior to securitization, for essentially the same reason as in the case of general obligation bonds of the lessees.

A different securitization methodology is required in the case of other leases, e.g., leases that are too small to justify the cost of individual securitization, leases to entities that don't make periodic financial information disclosures or entities with low credit ratings, and leases that are not bondable net. Some of these can be securitized by pooling, whereas others may require more complicated methodologies or may not be securitizable at all. These examples illustrate the basic economics of fixed-income securitization and how it relates to the complexity of securitization solutions. The key economic point in this regard is that most fixed-income investment risk is systematic. Securitization methodologies involving asset pooling or tranching are potentially viable in such situations, because new assets with investment risk that is mostly systematic are more likely to have similar investment characteristics to securities that already exist than new assets with investment risk that is mostly idiosyncratic. Such assets are more likely to develop an investor clientele to support asset liquidity than assets with more general investment characteristics.

Tangible Asset Securitization

Durable tangible assets that can be stored at marginal cost can be securitized by conveying ownership to a legal holding entity charged with conserving the assets and issuing tradable depository certificates evidencing beneficial ownership rights to the asset and redemption by the certificate holder upon demand. The marketability feature of securitization imposes the additional requirement of an essentially liquid market for the certificates, which suggests that this securitization methodology is applicable primarily in the case of fungible assets.

This simple securitization methodology constituted the basis for various hard currency systems of the past that based the value of currency on durable commodities, e.g., countries that were on the 'gold standard' or the 'silver standard.' In particular, the U.S. was once on both standards and issued certificates of ownership and redemption for both metals: gold certificates representing the right to withdraw gold coins or bullion on deposit at the U.S. Treasury, and silver certificates representing the right to withdraw silver coins or bullion.

More generally, the quasi securitization of tangible assets has been a fixture of the financial industry since the end of the U.S. Civil War (for purposes of some embodiments herein, the definition of quasi in the abridged sixth edition of Black's Law Dictionary is appropriate) (indeed, if terminology not defined herein is unclear from its context, please refer to Black's Law Dictionary (abridged sixth edition)). Historically, the quasi-securitized assets were consumable and recyclable commodities, and quasi securitization was achieved through the private establishment of organized commodity exchanges. The exchanges create liquidity in the quasi-securitized assets by providing, supporting and promoting a central marketplace for trading the quasi securities. The exchanges reduce investor uncertainty concerning the idiosyncratic physical characteristics of securitized commodities to immaterial levels by standardizing the classification of each commodity into fungible subtypes with homogeneous investment characteristics for market valuation purposes and by imposing (and enforcing) minimum quality and uniformity standards on the quasi-securitized commodities.

Transaction and financing costs are minimized for most investors and perishability constraints circumvented by designing the quasi securities as options and futures contracts on specified quantities and fungible subtypes of each commodity. For example, storage and transportation costs are avoided by investors who close out their investment positions rather than take delivery of the commodities, and the investors who do not avoid the costs would incur them regardless of whether the commodities are quasi-securitized.

This process for bringing liquidity to commodities such as fungible agricultural products is characterized as quasi securitization because the tradable contracts generated by the process are not securities. However, each contract could be transformed into one or more marketable securities by creating a Special Purpose Entity (SPE) to hold the contract.

Commodity investors would then be able to trade securitized equity interests in the resulting SPEs instead of the actual contracts. This would comprise the actual securitization of agricultural commodities rather than the quasi securitization of the commodities that currently takes place on commodity exchanges, which would generate additional protection for participants in U.S. commodities markets due to the applicability of federal securities laws and regulations. However, the implementation of actual securitization would impose incremental overhead costs on market participants in terms of actual monetary outlays for securitization and shortened trading lives of what are already relatively short-lived assets due to the time required for securitization, and it is not apparent that the relative advantages of actual securitization are sufficient to justify the incremental costs at this time.

Consumable and recyclable tangible assets that are not fungible have not been securitized, and securitization may not be feasible in such cases. However, in the case of leased tangible assets, securitization methodologies that do not necessarily involve asset pooling exist that are frequently viable.

The investment characteristics of leased assets are a combination of fixed-income and unencumbered asset investment characteristics. Accordingly, the investment characteristics of leased assets differ materially when the leases differ materially, even if the assets are fungible when unencumbered by leases. Thus leased assets are not fungible.

However, in many cases the investment characteristics of leased assets can be simplified for investment purposes by unbundling the ownership rights to split the asset into two separately owned pieces: for example, into a fixed-income asset component and an unencumbered tangible asset component, or, more generally, into a fixed-income asset component and a non-fixed-income asset component. This process is analogous to tranching, in that it produces two investment assets with simpler investment characteristics than the original leased asset. After the leased asset is unbundled, the securitization of the components becomes two separate problems with potentially unrelated securitization solutions.

For example, the ownership of a reusable tangible personal asset, e.g., an asset that is durable, can be separated into a term of years interest and a remainder interest. In an embodiment, the asset is leased and the remaining portion of the lease term consists essentially of (or consists of—depending on the embodiment) the term of the term of years interest. Accordingly, the term of years interest can be a fixed-income asset. In another embodiment, the asset is not leased but the term of years interest is a fixed-income asset. In still another embodiment, the term of years interest is not a fixed-income asset.

In many legal jurisdictions, e.g., jurisdictions within the United States, the term of years interest and the remainder interest can both be created by deed, with each interest having a corresponding distinct deed. Since the term of years interest and the remainder interest are assets with ownership defined by deed, each interest can be securitized, either together or separately, possibly even independently. For example, this can be accomplished with a separate SPE for each interest or with a single SPE for both interests. In the case of separate SPEs for the two interests, each SPE is responsible for conserving the deeded interest to which it has legal title. In the case of a single SPE, the SPE is responsible for conserving both deeded interests. In addition, the term of years interest is a fixed-income asset.

In one embodiment, the ownership interest represented by the deed for the term of years interest is vested. In another embodiment, the ownership interest represented by each deed is vested. In still another embodiment, each deed is recorded, for example, with an appropriate legal authority. For example, in the case of the United States, an example of an appropriate legal authority is the Secretary of State for the state, commonwealth, territory, federal district, or other region that has jurisdiction over ownership of the respective interest in property. Examples of such United States commonwealth, territorial, federal district, or other regional jurisdictions include the Commonwealth of Puerto Rico; Washington, D.C.; the Territory of the Virgin Islands; and the Territory of Guam. In the case of aircraft, another example of an appropriate legal authority in the United States is the Federal Aviation Agency. In the case of railroad equipment, e.g., railroad cars, another example of an appropriate legal authority is the Interstate Commerce Commission.

In an embodiment, the ownership interest represented by each deed is vested and each deed is recorded with an appropriate legal authority. This embodiment ensures that the maximum legal protection is accorded to equity investors in each securitized interest by property law, which is reasonably expected to contribute positively to the marketability or market valuation of the securitized asset. Examples of legal jurisdictions within the United States in which term of years and remainder interests in personal property can be created by deed and can be vested interests are the State of Virginia, the State of North Carolina, the State of Georgia, and the State of Nebraska.

In one embodiment, the deed for the term of years interest and the deed for the remainder interest deed are recorded with the same legal authority. In another embodiment, the deed for the term of years interest and deed for the remainder interest are recorded with different legal authorities. For example, in the United States, the different legal authorities could be the Secretary of State for different regional jurisdictions, e.g., different states. In still another embodiment, the deed for the term of years interest and the deed for the remainder interest are recorded in different countries.

The reusable tangible personal assets that can be securitized in this way include, for example, aircraft, ships, barges, houseboats, automobiles, trucks, movable oil drilling platforms and oil well platforms, railroad cars, paintings, sculptures, other works of art, gemstones, precious metal, and other precious objects such as jewelry. Furthermore, equity interests in tangible assets can be pooled prior to securitization. For example, deeded term of years interests can be pooled before securitization and the resulting pool securitized. If each term of years interest is a fixed-income asset, then the pool is also a fixed-income asset. Similarly, deeded remainder interests can be pooled before securitization and the resulting pool securitized. Each pool can be comprised of interests in different tangible assets.

Reusable tangible personal property can also be separated into an augmented term of years interest and a complementary remainder interest, in which the augmented term of years interest and the complementary remainder interest are both deeded interests. There may be either one deed for the augmented term of years interest or separate deeds for the components that comprise the augmented term of years interest, for example, a deed for a vested term of years component of the augmented term of years interest and a separate deed for a secondary contingent remainder interest component of the augmented term of years interest.

In one embodiment, the property is leased for a term, the remaining portion of which consists essentially of (or consists of—depending on the embodiment) the term of the unconditional component of the augmented term of years interest. In this case, the augmented term of years is a fixed-income asset with greater recourse in the event of lease default than the recourse usually available in the case of a corresponding term of years interest.

In an embodiment, the deed for the component of the augmented term of years interest that includes an unconditional term of years interest is vested and recorded with an appropriate legal authority, any other deeds for components of the augmented term of years interest are also recorded, and the at least one deed for the complementary remainder interest is also recorded. In this case, for purposes herein, the augmented term of years interest is referred to as a deeded and vested interest, whether or not there is a deed for a contingent component of the augmented term of years that is not vested.

State and territorial property law varies much more with regard to the rights defined by qualified fee interests in personal assets than it does in the case of qualified fee interests in real assets. Since personal assets are not fixed in location, this poses a potential problem: an owner of a qualified fee interest in a personal asset could under some circumstances improve the property rights defined by the qualified fee interest at the expense of other interest holders in the asset by selling the interest to a buyer in a different regional legal jurisdiction.

Several types of covenants can be inserted into a deed to an interest in a personal asset to prevent this situation from occurring in case the interest is a qualified fee interest. For example, the deed can include an express covenant specifying the legal jurisdiction that defines the property rights in the deed. Another possibility is an express covenant restricting each transferee of the interest, e.g., with a restriction on the domicile of each transferee. Still another possibility is an express covenant restricting each recording of the deed, e.g., to one specific legal jurisdiction or to any from an express list of legal jurisdictions. Any combination of these covenants can be inserted into the deed as deemed appropriate by interested parties when the fee interest is created.

Property Rights Securitization

A property right in an asset can be defined as the property right associated with an appropriately deeded fee interest in the asset. Accordingly, a property right in an asset can be securitized by securitizing a deed to the property right. More generally, at least one property right in an asset can be securitized by securitizing a deed to the at least one property right. Still more generally, at least one property right in an asset can be the at least one property right associated with more than deeded fee interest in the asset. In such cases, the at least one property right can be securitized by securitizing the pooled deeds.

This securitization methodology can be applied to property rights associated with tangible assets, property rights associated with intangible assets, and property rights associated with real assets. Examples of property rights in real assets, e.g., property rights associated with real estate, that can be securitized in this way include the following: mineral rights, water rights, timber rights, and air rights. In one embodiment, at least one deeded fee interest does not include a fee interest in surface land.

Mobile air rights can be securitized in this way if they are not already securitized. Alternatively, mobile air rights can be issued in fungible units, e.g., as certificates of ownership of a standardized volume of mobile air rights with standardized regulatory exemption rights.

In the case of fungible certificates that are limited liability transferable assets, the certificates can be assembled to comprise larger volumes of mobile air space. This implies that such certificates are marketable, which implies that the certificates are securities. In short, mobile air rights can be issued as securities.

Securitization of Firms

As defined in Black's law dictionary, a firm is a business entity or enterprise. This is distinct from an asset and also from a pool of assets for purposes herein and for financial and investment purposes in general, although firms usually do own assets. The distinction reflects differences in financial and investment characteristics of firms and assets. One key difference is that firms have dynamic investment policies that can change over time, for example, in response to evolving market conditions, whereas assets and pooled assets do not. For example, firms can decide to raise capital. Firms can also decide to change the investment characteristics of the firm, e.g., by selling assets and reinvesting some or all of the proceeds through acquisition of other assets. By contrast, assets and pools of assets do not have investment policies and cannot decide to raise capital, redeploy capital or otherwise change the investment characteristics of the firm. Thus a firm is not an asset or pool of assets, and a securitized firm is not a securitized asset or a securitized asset pool. In general, this distinction is acknowledged in financial market terminology, in which loans secured by legal recourse to specific assets are labeled asset-based or asset-backed financings, whereas loans not secured by legal recourse to specific assets, e.g., most securitized loans to large firms, are labeled credit-based financings.

The securitization of equity investment interests in firms has been a mainstay of the financial industry for at least 160 years. In contrast to fixed-income assets, which have investment risk that is primarily systematic, about half of the variance in returns from securitized corporate equity is idiosyncratic. Thus pooled equity in firms is an asset with significantly different investment characteristics than individual assets in the pool.

This does not imply anything conclusive concerning the impact of pooling on the aggregate value of unsecuritized firms. However, it does raise the question of whether pooling such assets maintains aggregate asset value on a consistent basis.

If the answer to this question is "no," then the securitization proposition implies that securitization methodologies that involve pooling are less likely to enhance the asset value of firms than the securitization of individual firms. This suggests that many more securitizations of individual firms should take place than securitizations of pooled firms, and many more securitizations of focused firms than securitizations of fledgling conglomerates. This is consistent with descriptions of IPOs in the equity markets over many decades, with the notable exception of conglomerates in the 1950s-1960s.

Conglomerates are securitized firms that aggregate diverse unsecuritized firms under one securitized umbrella firm. They were successful public offerings in the mid-twentieth century because of the popular management idea at the time that exceptional management skills are largely independent of specific industry expertise. Accordingly, investors viewed exceptional corporate governance as easily portable across enterprises with relatively uncorrelated investment risk.

Conglomerates ceased to be created as the popularity of the management idea faded and the cost of equity capital rose for existing conglomerates. Eventually the conglomerate corporate structure became perceived as a value depressant, and most conglomerates were disaggregated into more focused securitized firms.

The lessons from conglomerates may be applicable to REITs. REITs are securitized firms that receive more favorable treatment from the tax code than most firms in return for compliance with constraints on their operating activities and ownership. For example, REITs must derive at least 75% of their ordinary operating income from investments in real estate-related assets in most years and distribute at least 90% of the ordinary income to shareholders. A REIT that has most of its real estate capital invested in commercial real estate equity is known as an equity REIT.

Although many investors perceive equity REITs to be securitized commercial real estate, real estate investment characteristics suggest otherwise. For example, the average proportion of idiosyncratic investment risk in commercial real estate has been even higher historically than the average proportion of idiosyncratic risk in stocks. Unless unidentified real estate investment characteristics compensate for the failure of pooling in general to enhance the value of unsecuritized assets with highly idiosyncratic investment risk, it is unlikely that equity REITs enhance asset value through securitization. Accordingly, there must be another explanation for the recent success of equity REITs at raising capital.

The constraints on REITs are intended to make the firms into real estate analogues of stock and bond investment companies, which also are treated favorably by the tax code.

However, stock and bond investment companies invest passively in assets that are already securitized.

Three investment characteristics suggest that equity REITs resemble conglomerates more closely than they resemble investment companies: investments in unsecuritized assets, the high proportion of idiosyncratic risk in the unsecuritized assets, and the inclusion of real estate management services and development activity among permissible business activities.

These considerations suggest three hypotheses for the recent success of REITs in the capital markets: REITs recently have acquired some systematic business advantage not available to conglomerates, commercial real estate investment characteristics have changed recently to reduce the proportion of real estate investment risk that is idiosyncratic, or REITs are an impermanent phenomenon that will fade in time like conglomerates. Regardless of what explanation is correct, any advantage that REITs have in accessing the capital markets must have appeared relatively recently, because REITs have been around since 1960 but were not noticeably successful at raising investment capital until 1991.

The magnitude of the benefit that firms receive from securitization is difficult to measure and varies across firms. However, events in the aftermath of the Enron and Worldcom collapses provide an indication in this regard. Securitization costs continue to accrue after the firm is securitized due to the ongoing cost involved in complying with regulatory information disclosure requirements. The ongoing cost of compliance increased following the Enron and Worldcom collapses as the Sarbanes-Oxley bill raised the disclosure requirements to forestall any recurrence of these unanticipated events.

The diseconomies of small scale inherent in securitization costs are present in the ongoing cost of compliance with disclosure requirements, which implies that the increased burden of compliance disproportionately impacts small firms. In response to the incremental disclosure requirements, a number of small publicly traded firms with healthy balance sheets and income statements delisted their stocks to eliminate the ongoing cost of compliance. This implies that the economics governing the securitization of small firms has been materially altered.

Intangible Asset Securitization

Many forms of intangible assets besides intangible fixed-income assets are property that can be securitized, including intellectual property. The property can be reusable and durable, for example, in many cases, patents, trademarks and copyrights. Such assets are candidates for securitization. Accordingly, each such property can be separated into a term of years interest and a remainder interest.

In many legal jurisdictions, e.g., jurisdictions within the United States, the term of years interest and the remainder interest can both be created by deed, with each interest having a corresponding distinct deed. Since the term of years interest and the remainder interest are assets with ownership defined by deed, each interest can be securitized, either together or separately, possibly even independently. For example, this can be accomplished with a separate SPE for each interest or with a single SPE for both interests. In the case of separate SPEs for the two interests, each SPE is responsible for conserving the deeded interest to which it has legal title. In the case of a single SPE, the SPE is responsible for conserving both deeded interests.

If the term of years interest is leased, and the remaining portion of the lease term essentially includes the term of the term of years interest, then the term of years interest is a fixed-income asset. Embodiments can involve either leased or unleased term of years interests or both.

In one embodiment, the ownership interest represented by the deed for the term of years interest is vested. In another embodiment, the ownership interest represented by each deed is vested. In still another embodiment, each deed is recorded, for example, with an appropriate legal authority. For example, in the case of the United States, an example of an appropriate legal authority is the Secretary of State for the state, territorial, federal district, or other region that has jurisdiction over ownership of the respective interest in property. Examples of territorial, federal district, or other regional jurisdictions include the Commonwealth of Puerto Rico; the District of Columbia, the Territory of the Virgin Islands, and the Territory of Guam.

In an embodiment, the ownership interest represented by each deed is vested and each deed is recorded with an appropriate legal authority. This embodiment ensures that the maximum legal protection is accorded to equity investors in each securitized interest by property law, which is reasonably expected to contribute positively to the marketability or market valuation of the securitized asset. Examples of legal jurisdictions within the United States in which term of years and remainder interests in personal property can be created by deed and can be vested interests are the State of Virginia, the State of North Carolina, the State of Georgia, and the State of Nebraska.

In one embodiment, the deed for the term of years interest and the deed for the remainder interest deed are recorded with the same legal authority. In another embodiment, the deed for the term of years interest and deed for the remainder interest are recorded with different legal authorities. For example, in the United States, the different legal authorities could be the Secretary of State for different regional jurisdictions, e.g., different states. In still another embodiment, the deed for the term of years interest and the deed for the remainder interest are recorded in different countries.

Equity interests in intangible assets can be pooled prior to securitization. For example, deeded term of years interests can be pooled before securitization and the resulting pool securitized. If each term of years interest is a fixed-income asset, then the pool is also a fixed-income asset. Similarly, deeded remainder interests can be pooled before securitization and the resulting pool securitized. Each pool can be comprised of interests in different tangible assets.

Reusable intangible personal property can also be separated into an augmented term of years interest and a complementary remainder interest, in which the augmented term of years interest and the complementary remainder interest are deeded interests. There may be one deed for the augmented term of years interest or separate deeds for components that comprise the augmented term of years interest, for example, a deed for a vested term of years component of the augmented term of years interest and a separate deed for a secondary contingent remainder interest component of the augmented term of years interest.

In one embodiment, the property is leased and the remaining portion of the lease term is essentially at least as long as the term of the unconditional component of the augmented term of years interest. In this case, the augmented term of years is a fixed-income asset with more recourse in event of lease default than the recourse available to a corresponding term of years interest.

In an embodiment, the deed for the at least one component of the augmented term of years interest that includes an unconditional term of years interest is vested and recorded with an appropriate legal authority, any other deeds for components of the augmented term of years interest are also recorded, and the at least one deed for the complementary remainder is also recorded. In this case, for purposes of some embodiments herein, the augmented term of years interest is referred to as a deeded and vested interest, whether or not there is a deed for a contingent component of the augmented term of years that is not vested.

Intellectual property can be licensed as well as leased. Ownership of all or part of the future revenues generated by a license can be securitized, for example, either as a deeded interest or other assignment of the ownership rights to the SPE created as part of the securitization process to conserve or hold the asset. In another embodiment, the deeded interest or other assignment of the ownership rights is recorded with an appropriate legal authority. The asset can be securitized either as an interest in an individual license or as part of a pool of interests in such licenses.

Implications

Securitization is the process of selectively transforming assets by converting ownership interests into marketable securities with the same investment characteristics as the original asset other than liquidity and limited liability. The transformation enhances asset value before securitization cost is considered by raising the demand curve for the asset without impacting the supply curve.

Processes that include changing investment characteristics other than liquidity and owner liability can be regarded as a two-stage asset transformation methodology: alteration of the asset to change the other investment characteristics followed by securitization of the altered asset. The impact of two-stage methodologies on asset value can frequently be determined by separately examining the successive impact of each stage on asset value.

Assets with approximately homogeneous investment characteristics can be pooled to generate an asset with essentially the same investment characteristics as the component assets. This applies to assets with approximately homogeneous systematic risk and a low proportion of idiosyncratic risk such as residential mortgages and to fungible classes of commodities.

The impact of the two-stage methodology is easily described in this case, since the first stage is immaterial to investment characteristics other than liquidity. It follows that the effects of asset pooling are improved liquidity for shares (e.g., fungible ownership interests) in the new asset and economies of scale that reduce the impact of securitization costs. Since the securitization stage enhances value, the two-stage methodology enhances asset value in this case. In the case of residential finance, the methodology is estimated to have reduced the cost of mortgages for homeowners by as much as two hundred basis points.

The impact on asset value of methodologies that involve pooling becomes less certain as the investment characteristics of individual assets in the pool become more heterogeneous. Some additional uncertainty exists in the case of pooled assets with heterogeneous exposure to the same systematic investment risk factors but with uniformly high systematic risk. This applies to pooled commercial real estate mortgages, pooled commercial leases, and pooled corporate debt such as receivables.

The market for securitized fixed-income assets has grown strongly over the last fifteen years. Nonetheless, many such assets are not securitized, and many originators of fixed-income assets resist standardizations that would simplify asset securitization, apparently because the prospective savings do not justify the compromise of idiosyncratic business objectives.

The prospects for creating incremental value through securitization methodologies that involve pooling become progressively less certain as the average proportion of systematic investment risk across the pooled assets is reduced. For example, pooling of assets prior to securitization is rarely observed in cases in which at least half of the investment risk of individual pooled assets is idiosyncratic. This applies in general to the securitization of firms.

The securitization of a reusable tangible asset by separating the asset into either a term of years component and a remainder component or into an augmented term of years component and a complementary remainder component and then separately securitizing each component is a special case of a more general asset securitization methodology. In general, an asset can be securitized by separating the asset into two or more components and separately securitizing each said component. If one component is securitized and another component is not securitized, then this is a securitization methodology for the one component. Both illustrations are examples of a securitization methodology for an asset component.

Most commercial real estate investment risk is idiosyncratic. Accordingly, equity REITs comprise a recent anomaly to the observed pattern for securitization.

Recent advances in securitization technology focus on assets with a high proportion of systematic investment risk. This is consistent with slightly earlier advances in investment theory collectively known as MPT, which view investment risk as separable into systematic and idiosyncratic components and regard systematic risk factors as more significant for purposes of asset pricing. Fixed-income securitization methodologies based on pooling can be regarded from this perspective as an application of MPT to finance.

Computer System

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality, and in some embodiments (depending on context herein) computer systems can overlap. For example, but Securities Generation System 20 can be one computer system (FIG. 2) while the Securities Distribution System 34 comprises a multicomputer system. Logic flow can represent signal processing, such as digital data processing, communication, or as evident from the context hereinafter. Logic flow or "logic means" can be implemented in discrete circuits, programmed computer, or the equivalent. Computer-readable media, as used herein can comprise at least one of a RAM, a ROM, A disk, an ASIC, and a PROM. Industrial or technical applicability is clear from the description, and is also indicated below.

Illustratively, an embodiment can include a Securities Generation Computer System 20 for manipulating signals to produce an illustration of the conversion of one or more illiquid interests in property into securities. FIG. 1 shows one embodiment of the apparatus of Securities Generation Computer System 20. The embodiment is comprised of a computer controlled by a Processor 2, at least one Input Device 4 connected to receive Input Data 6, at least one Output Device 8 connected to generate output, and a Memory System 10, for example, a hard drive for the computer or located remotely, for example, in another computer connected to the computer. A Logic Means 12 controls the processor to implement the securitization process. In one embodiment, Logic Means 12 is a computer program stored in Memory System 10. In said embodiment, Memory System 10 also stores a Word Processing Program 14 and at least one Word Processing Document 16. In FIG. 1, Input Device 4 refers collectively to the connected input devices and Output Device 6 refers collectively to the connected output devices.

Computer Network

Input Device 4 is connected to receive input signals to Computer Securities Generation System 20 from other computers in a multicomputer securitization system. Output Device 8 is connected to communicate output signals to other computers in the multicomputer securitization system. The multicomputer securitization is comprised of a computer network.

FIG. 2 shows an embodiment of the computer network of the securitization system. Each computer system in the computer network has a processor, an input device connected to receive input signals from at least one other computer in the network, an output device connected to communicate output to at least one other computer in the network, and a memory system, which may be located remotely from the respective computer system processor.

In one embodiment, with reference to FIG. 2, the securitization system is comprised of Securities Generation Computer System 20, Insurance Computer System 22, Tax Attorney Computer System 24, Tax Analyst Computer System 26, Rating Agency Computer System 28, Regulatory Agency Computer System 29, Disclosure Computer System 30, Offering Document Computer System 32, and Securities Distribution System 34.

In each implementation of the securitization process, Securities Generation Computer System 20 converts ownership interests in illiquid assets into marketable securities that represent interests in at least one entity.

Insurance Computer System 22 has hardware and logic means analogous to Securities Generation Computer System 20, except that Computer System 22 is programmed to receive input signals from Computer System 20, manipulate the input to generate documentation for financial risk reduction insurance, e.g., credit-wrap insurance, for securities generated by Computer System 20, compute at least one insurance premium for the insurance, generate output including the insurance premium or at least some of the documentation, and communicate at least some of the output including at least some of the input over the securitization system computer network. In one embodiment, Computer System 22 communicates the at least some of the output to Computer System 20.

For example, in the case of one or more reusable tangible personal assets that are securitized by separating the assets into deeded term of years and remainder interests or augmented term of years and complementary remainder interests, forms of financial risk insurance that can be generated by Computer System 22 include: case law changes in property law that adversely affect the investment characteristics or value of one or more types of shares in the securitized asset; legislative changes in property law that adversely affect the investment characteristics or value of one or more types of shares in the securitized asset; legislative changes in tax law, e.g., in the case of the United States, federal law or state law, that adversely affect the investment characteristics or value of shares in the securitized asset through changes in cost recovery tax deductions, or in another embodiment through changes in property tax rates. Alternatively, in the case of a fixed-income interest in an entity, Computer System 22 can generate credit wrap insurance to protect investors in one or more types of shares in the entity against default risk. Still alternatively, or in addition, in the same case, Computer System 22 can generate yield maintenance insurance to protect against prepayment risk.

In one embodiment Computer System 22 is programmed to compute insurance premiums. In another embodiment, Computer System 22 is programmed to generate insurance policy documentation, e.g., one or more insurance policies. In still another embodiment, Computer System 22 is programmed to compute insurance premiums and documentation including one or more insurance policies.

Tax Attorney Computer System 24 has hardware and logic means analogous to Securities Generation Computer System 20, except that Computer System 24 is programmed to receive input from Computer System 20, generate documentation including a tax opinion for the securities generated by Computer System 20, generate output including at least some of the documentation and at least some of the input, and communicate at least some of the output including at least some of the input over the computer network, including the tax opinion. In one embodiment, Computer System 24 communicates the at least some of the output to Computer System 20.

Tax Analyst Computer System 26 has hardware and logic means analogous to Securities Generation Computer System 20 except for input. In a first embodiment, Computer System 26 is programmed to receive input from Computer System 20. In a second embodiment, Computer System 26 is programmed to receive input from Computer System 22. Computer System 26 manipulates the input using a stored financial model to compute a component of financial risk based on tax law risk for securities generated by Computer System 20, generates output including the component of financial risk, and communicates at least some of the output, including the component of financial risk, over the network. In the first embodiment, Computer System 26 communicates the at least some of the output to Computer System 20. In the second embodiment, Computer System 26 communicates the at least some of the output to Computer System 22.

In another embodiment, Computer System 26 manipulates the input using a stored financial model to compute a schedule of one or more tax payments for at least one type of security generated by Computer System 20, e.g., a schedule of income tax payments on scheduled cash flows in the case of a type of fixed-income security generated by Computer System 20, using a stored financial model, generates output including the schedule of income tax payments, and communicates at least some of the output, including said schedule of one or more tax payments, over the network. For example, in the United States, in the case of reusable property that is securitized by separating the ownership of the property into either a deeded term of years interest and a deeded remainder interest or a deeded augmented term of years interest and a deeded complementary remainder interest, with an entity for the deeded term of years or augmented term of years interest and a separate entity for the corresponding remainder or complementary remainder interest, the purchase price of shares in the term of years or augmented term of years interest is usually amortized over the term of the term of years or augmented term of years interest, with taxes on income received by investors from shares in the term of years or augmented term of years interest reduced accordingly by the amortization tax deductions. The corresponding remainder or complementary remainder interest receives no taxable income for income tax purposes during the term of the term of years or augmented term of years interest, and accordingly incurs no income tax during this period.

Rating Agency Computer System 28 has hardware and logic means analogous to Securities Generation Computer System 20. In one embodiment, Computer System 28 is programmed to receive input from Computer System 20. In another embodiment, Computer System 28 is programmed to receive input from Disclosure Computer System 30.

Computer System 28 is programmed to manipulate the input using a stored model to generate a credit rating for at least one type of fixed-income security generated by Computer System 20, generate output including each said credit rating and at least some of the input, and communicate at least some of the output, including each said credit rating and at least some of the input, over the network. In one embodiment, Computer System 28 communicates the output to Computer System 20.

Regulatory Agency Computer System 29 has hardware and logic means analogous to Securities Generation Computer System 20 except that Computer System 29 is programmed to receive input from Computer System 20, including an application to register securities generated by Computer System 20 for distribution purposes, manipulate the input to support determination of whether to approve the registration application, generate documentation including notification of the result of the determination, generate output including at least some of the documentation, and communicate the documentation over the network, e.g., to Computer System 20.

Disclosure Computer System 30 has hardware and logic means analogous to Securities Generation Computer System 20 except that Computer System 30 is programmed to receive input from Computer System 20, manipulate the input using stored financial documentation to generate disclosure documentation, e.g., a disclosure document, for at least one type of security generated by Computer System 20, generate output including each said disclosure document, and communicate at least some of the output, including each said disclosure document, over the network. In one embodiment, Computer System 30 communicates the at least some of the output to Computer System 20. In another embodiment, Computer System 30 communicates the at least some of the output to Computer System 28.

Offering Document Computer System 32 has hardware and logic means analogous to Securities Generation Computer System 20 except that Computer System 32 is programmed to receive input from Computer System 20, manipulate the input using stored financial documentation to generate an offering document for each type of security generated by Computer System 20 to be distributed, generate output including each said offering document, and communicate at least some of the output including each said offering document over the network. In one embodiment, Computer System 32 communicates the at least some of the output to Computer System 20. In another embodiment, Computer System 32 communicates the at least some of the output to Securities Distribution System 34. Each offering document can be a term sheet, an offering memorandum, a prospectus, or other offering document as selected by Computer System 32.

With reference to FIG. 3, in one embodiment, Securities Distribution System 34 is comprised of a multicomputer network included in the computer network of the securitization system. In one embodiment, Securities Distribution System 34 includes Securities Transaction Computer System 36, Securities Pricing Computer System 38, Seller Computer System 40, and Bidder Computer System 42. For purposes of some embodiments herein, bidder is defined as one who makes an offer to buy.

Securities Transaction Computer System 36 has hardware and logic means analogous to Securities Generation Computer System 20 except that Computer System 36 is programmed to conduct a sale of the securities to be distributed and to receive input over the network including disclosure documentation for each type of security to be distributed. Computer System 36 manipulates the input to determine the format of the sale using stored documentation, generate offering documentation for the securities to be distributed, communicate the offering documentation and disclosure documentation to Bidder Computer System 42, determine which bid or bids are successful, generate sale documentation notifying each successful bidder of the items purchased and the amount of the purchase using stored documentation, and communicate the sale documentation over the network. If the format of the sale is an auction, then the offering documentation includes a bidder form in which the prices are to be filled in by Bidder Computer System 42. If the format of the auction includes reserve prices for the securities, then Computer System 36 receives the reserve prices from Securities Pricing Computer System 38. If the format of the sale involves specified seller prices or target prices in a bid-or-buy format, then Computer System 36 receives the specified prices or target prices from Securities Pricing Computer System 38. If the format of the sale is an auction or bid-or-buy process that requires seller approval after the close of the auction to consummate the transaction, then Computer System 36 generates notification documentation to notify. Seller Computer System 40 of the prices or amounts that require seller approval using stored documentation, generates output including at least part of the notification documentation, and communicates at least part of the output over the network. In this case, Computer System 36 receives second input from Seller Computer System 40 and manipulates the second input to determine whether to consummate or reject all or part of the transaction. In one embodiment, the decision is limited to consummation or rejection of the entire transaction.

In one embodiment, Securities Transaction Computer System 36 can be part of an organized financial exchange, e.g., the New York Stock Exchange. In another embodiment, System 36 can be a system belonging to a business that sells securities to a limited clientele of investors. In still another embodiment, System 36 can be a computer system of a organized private exchange that is available to only a limited clientele of financial organizations. In yet another embodiment, System 36 can be a computer system of the seller, in which case System 36 and System 40 could either be the same computer system or different systems, depending on the securities distribution system architecture. Securities Pricing Computer System 38 has hardware and logic means analogous to Securities Generation Computer System 20 except that Computer System 38 is programmed to receive input from Computer System 20, manipulate the input using at least one stored model to compute a valuation for each type of security generated by Computer System 20 to be distributed, generate output including each said valuation and at least some of the input, and communicate at least some of the output, including each said valuation and at least some of the input, over the computer network.

In one embodiment, in the case of each type of security that represents a fixed-income interest in an entity, a market-based yield to maturity is computed based on a yield curve for minimal-risk securities, e.g., U.S. Treasury security interest rates, and at least one risk factor including credit risk for the type of security and, in some cases, prepayment risk for the type of security, e.g., based on a prepayment risk computation by Computer System 38 that manipulates the input data using a stored prepayment risk model. The valuation is computed as the present value of the cash flow schedule for the type of security discounted at the market-based yield to maturity. In another embodiment, an after-tax market-based yield to maturity is computed based on the pre-tax market-based yield to maturity and a selected tax rate. In this case, the valuation is computed as the present value of the after-tax cash flow schedule for the type of security discounted at the after-tax market-based yield to maturity.

Seller Computer System 40 has hardware and logic means analogous to Securities Generation Computer System 20 except that Computer System 40 is programmed to receive input notifying the seller at the conclusion of the transaction of the number of securities of each type that are the subject of successful bids, the total amount of the successful bids for each type of security, and the combined total amount of the successful bids. If any part of the transaction requires seller approval to consummate, then Computer System 40 receives second input, manipulates the second input to generate determining documentation instructing Computer System 36 on whether or not to close transactions involving successful bids for each type of security, generates output including at least part of the determining documentation, and communicates at least part of the output over the network. In one embodiment, the decision is limited to consummation or rejection of the entire transaction. There is usually only one seller computer system, although in some cases there may be more than one.

Bidder Computer System 42 has hardware and logic means analogous to Securities Generation Computer System 20 except that Computer System 40 is programmed to receive input from Securities Transaction Computer System 36 including software to generate bid documentation including a bid, communicate the bid to Computer System 36 over the network, receive confirmation of the bid from Computer System 36, receive notification if any part of the bid is successful and a sale is consummated, and receive an invoice for the sale. If the transaction is conducted in auction format, then there is more than one bidder computer system. In cases of pre-specified transaction prices, there may be either one or more than one buyer computer systems.

Process Description

In one embodiment, with reference to FIG. 4, Input Device 4 receives input data in Receive Input 50 including data representing an asset comprised of one or more illiquid interests in property and manipulates the input data to generate input signals. In Determine Entity 52, Logic Means 12 manipulates the input signals to determine whether or not to generate an entity for the securitized asset. In one embodiment, the input data is received from a single input device. In another embodiment, input data from more than one connected input device is used by Logic Means 12 to make the determination. If the asset is a corporation, the answer is usually "no." In many other cases, the answer is usually "yes." If the answer is "yes," Logic Means 12 manipulates the input signals in Select Number of Entities 54 to determine the number of entities that collectively will conserve or hold the securitizable asset. In Select Type of Entity 56, Logic Means 12 manipulates the input signals to select at least one defining document template for at least one new entity using data stored in Memory System 10, for example, in a word processing file, and further manipulates the input signals to identify an appropriate holding entity for each said illiquid interest in property among the new entities.

If the answer in Determine Entity 52 is "no," Logic Means 12 proceeds to Determine Capital Structure 58 and manipulates the input signals to determine whether or not to generate a capital structure for each said holding entity. If the answer in Determine Capital Structure 58 is "yes," Logic Means 12 manipulates the input signals in Select Capital Structure of Entity 60 to determine the capital structure of each said holding entity, including the number of capital classes, the types of shares in each capital class, and the number of shares of each type. For example, in the case of pass-through MBS for a pool of residential mortgages, there is usually one entity, one capital class, and one type of share; in the case of CMOs, there is usually one entity, one capital class, and two or more types of shares; in the case leased tangible property, there usually are two entities, one capital class for each entity, and one type of share for each entity. In the case of shares in an entity that holds interests in debt, the shares are frequently referred to as bonds, and there is a face or principal amount associated with each share.

In Generate Defining Document for Entity 62, Logic Means 12 manipulates the input signals to generate defining documentation, e.g., a defining document, for each said holding entity using data stored in Memory System 10, for example, from one or more document templates stored in Memory System 10 in the form of word processing files.

If the answer in Determine Capital Structure 58 is "no," Logic Means 12 proceeds to Generate Defining Document for Shares 64 and manipulates the input signals to generate defining documentation for the corresponding shares.

In one embodiment, Securities Generation Computer System 20 receives input including either documentation for financial risk reduction insurance for at least some of the securities generated by Computer System 20 or an insurance premium for the insurance or both the documentation and the insurance premium.

In another embodiment, Computer System 20 receives input including documentation including a tax opinion for the securities generated by Computer System 20 from Tax Attorney Compute System 24.

In still another embodiment, Computer System 20 receives input including a quantitative measurement of a component of financial risk based on tax law risk for securities generated by Computer System 20 from Tax Analyst Computer System 26.

In still another embodiment, Computer System 20 receives input including at least one credit rating for fixed-income securities generated by Computer System 20 from Rating Agency Computer System 28.

In still another embodiment, Computer System 20 receives input including documentation certifying the registration of securities generated by Computer System 20 for distribution purposes from Regulatory Agency Computer System 29.

In still another embodiment, Computer System 20 receives input including disclosure documentation, e.g., a disclosure document, for at least one type of security generated by Computer System 20 from Disclosure Computer System 30.

In still another embodiment, Computer System 20 receives input including an offering document for each type of security generated by Computer System 20 to be distributed from Offering Document Computer System 32.

In other embodiments, Computer System 20 can receive input from any combination of Computer Systems 22-34 corresponding to output of said computer systems communicated over the network.

Note that as used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow or "logic means" can be implemented in discrete circuits, programmed computer, or the equivalent. Computer-readable media, as used herein can comprise at least one of a RAM, a ROM, A disk, an ASIC, and a PROM. Industrial or technical applicability is clear from the description, and is also indicated below.

In sum, appreciation is requested for the range of possibilities flowing from the core teaching herein. More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments are as described and suggested herein. Although the disclosure herein has been described with reference to specific embodiments, the disclosures are intended to be illustrative and are not intended to be limiting. Various modifications and applications may occur to those skilled in the art without departing from the true spirit and scope defined in the appended claims.

Thus, although only a few exemplary embodiments have been described in detail above, those skilled in the art will readily appreciate that many modifications are possible in the exemplary embodiments without materially departing from the novel teachings and advantages herein. Accordingly, all such modifications are intended to be included within the scope defined by claims. Means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures. The accompanying drawings illustrate embodiments intended to illustrate and exemplify in a teaching manner.

The invention claimed is:

1. A computer-aided method to consummate a sale, comprising:
    receiving, by a computer system comprising a computer, input data associated with an interest in a securitized pool of personal-small-aircraft mortgages, at least half of the pool by value being equity interests in individual personal-small-aircraft mortgages, the input data comprising a bid for the interest in the securitized pool; and
    computing, by the computer using at least some of the input data, a valuation of at least some of the interest in the securitized pool in
    consummating, by the computer, a sale of the at least some of the interest in the securitized pool at a price corresponding to the valuation.

2. The method of claim 1, wherein the interest in the securitized pool is an equity interest in the securitized pool.

3. A computer-aided method to produce and communicate a bid, comprising:
    receiving, at a computer system comprising a computer, input data associated with an interest in a securitized pool of personal-small-aircraft mortgages, at least half of the pool by value being equity interests in individual personal-small-aircraft mortgages;
    producing, by the computer using at least some of the input data, output including a bid for at least some of the interest in the securitized pool; and
    communicating, by the computer, at least some of the output, including the bid, to a securities transaction computer system.

4. The method of claim 3, wherein the interest in the securitized pool is an equity interest in the securitized pool.

5. A computer-aided method to produce and communicate an offer, comprising:
    receiving, at a computer system comprising a computer, input data associated with an interest in a securitized pool of personal-small-aircraft mortgages, at least half of the pool by value being individual personal-small-aircraft mortgages;
    producing, by the computer using at least some of the input data, output including an offer to sell at least some of the interest in the securitized pool; and
    communicating, by the computer, at least some of the output, including the offer, to a securities transaction computer system.

6. The method of claim 5, wherein the interest in the securitized pool is an equity interest in the securitized pool.

7. The method of any one of claims 1, 3, 5, further including:
    generating, by the computer, documentation for financial risk reduction insurance for the interest in the securitized pool; and
    producing, by the computer, the documentation at an output device.

8. A computer-aided method to generate financial risk reduction insurance and documentation, the method including:
    receiving, at a computer system comprising a computer, input data associated with an interest in a securitized pool of personal-small-aircraft mortgages, at least half of the pool by value being equity interests in individual personal-small-aircraft mortgages;
    generating, by the computer processing at least some of the input data, documentation for financial risk reduction insurance for the interest in the securitized pool; and
    producing, by the computer, the documentation at an output device.

9. The method of claim 8, wherein the interest in the securitized pool is an equity interest in the securitized pool.

10. An apparatus comprising:
    a computer system configured to carry out the operations of:
    receiving input data associated with an interest in a securitized pool of personal-small-aircraft mortgages, at least half of the pool by value being equity interests in individual personal-small-aircraft mortgages, the input data comprising a bid for the interest in the securitized pool;
    computing, using at least some of the input data, a valuation of at least some of the interest in the securitized pool; and
    consummating a sale of the at least some of the interest in the securitized pool at a price corresponding to the valuation.

11. An apparatus comprising:
    a computer system configured to carry out the operations of:
    receiving input data associated with an interest in a securitized pool of personal-small-aircraft mortgages, at least half of the pool by value being equity interests in individual personal-small-aircraft mortgages;
    producing, using at least some of the input data, output including a bid for at least some of the interest in the securitized pool; and communicating at least some of the output, including the bid, to a securities transaction computer system.

12. An apparatus comprising:
a computer system configured to carry out the operations of:
receiving input data associated with an interest in a securitized pool of personal-small-aircraft mortgages, at least half of the pool by value being individual personal-small-aircraft mortgages;
producing, using at least some of the input data, output including an offer to sell at least some of the interest in the securitized pool; and
communicating at least some of the output, including the offer, to a securities transaction computer system.

13. An apparatus comprising:
a computer system configured to carry out the operations of:
receiving input data associated with an interest in a securitized pool of personal-small-aircraft mortgages, at least half of the pool by value being equity interests in individual personal-small-aircraft mortgages;
generating output including documentation for financial risk reduction insurance for the interest in the securitized pool; and
producing at least some of the output, including the documentation, at an output device.

14. The method of any one of claims 1, 2, further including generating, by the computer, output comprising a financial document including one of the price and the valuation.

15. The method of any one of claims 1, 2, further including generating, by the computer, output comprising a financial document including one of the price and the valuation and communicating at least some of the output including the financial document to an other computer system.

16. The apparatus of claim 10, wherein the computer system is further configured to carry out the operation of generating output comprising a financial document including one of the price and the valuation.

17. The apparatus of claim 10, wherein the computer system is further configured to carry out the operations of generating output comprising a financial document including one of the price and the valuation and communicating at least some of the output including the financial document to an other computer system.

18. The method of any one of claims 1,3,5,8, wherein the interest includes an interest in at least one mobile air right.

19. The apparatus of any one of claims 10-13, 16-17, wherein the interest includes an interest in at least one mobile air right.

20. The method of any one of claims 1, 2, wherein the receiving includes receiving signals representing one of the at least some of the input data and at least some of the input data from an other computer system.

21. The method of any one of claims 3, 4, wherein the receiving includes receiving signals representing one of the at least some of the input data and at least some of the input data from an other computer system.

22. The apparatus of claim 10, wherein the operation of receiving input data includes receiving signals representing one of the at least some of the input data and at least some of the input data from an other computer system.

23. The apparatus of claim 11, wherein the operation of receiving input data includes receiving signals representing one of the at least some of the input data and at least some of the input data from an other computer system.

24. The apparatus of claim 16, wherein the operation of receiving input data includes receiving signals representing one of the at least some of the input data and at least some of the input data from an other computer system.

25. The apparatus of claim 17, wherein the operation of receiving input data includes receiving signals representing one of the at least some of the input data and at least some of the input data from an other computer system.

26. An apparatus comprising:
a first computer system controlled to receive first input, said first input representing data associated with an interest in a securitized pool of personal-small-aircraft mortgages, at least half of the pool by value being individual personal-small-aircraft mortgages, to produce, using at least some of the first input, first output including a bid for at least some of the interest in the securitized pool, and to communicate at least some of the first output including the bid to
a second computer system controlled to receive one of the at least some of the first output and at least some of the first output as second input, wherein said second input includes the bid, to generate, using at least some of the second input, a valuation of one of the at least some of the interest and at least some of the interest, and to consummate a sale of the one of the at least some of the interest and at least some of the interest at a price corresponding to the valuation.

27. The apparatus of claim 26, wherein the interest in the securitized pool is an equity interest in the securitized pool.

28. An apparatus comprising:
a first computer system configured to carry out the operations of receiving first input, said first input representing data associated with an interest in a securitized pool of personal-small-aircraft mortgages, at least half of the pool by value being individual personal-small-aircraft mortgages, producing, using at least some of the first input, first output including a bid for at least some of the interest in the securitized pool, and communicating at least some of the first output including the bid to
a second computer system configured to carry out the operations of receiving one of the at least some of the first output and at least some of the first output as second input, said second input including the bid, computing, using at least some of the second input, a valuation of one of the at least some of the interest and at least some of the interest, and consummating a sale of the one of the at least some of the interest and at least some of the interest at a price corresponding to the valuation.

29. The apparatus of claim 28, wherein the interest in the securitized pool is an equity interest in the securitized pool.

30. The apparatus of any one of claims 26 to 29, wherein the apparatus includes another computer system controlled to receive another input representing one of the data associated with the interest in the securitized pool and data associated with the interest in the securitized pool, to produce, using at least some of the other input, an offer to sell the interest in the securitized pool, and to communicate the offer to one of the first computer system and the second computer system.

31. The apparatus of any one of claims 26 to 29, wherein the second computer system is controlled to generate an offering document for the interest in the securitized pool and to communicate the offering document to the first computer system.

32. The apparatus of claim 30, wherein at least one of the second computer system and the other computer system is controlled to generate an offering document for the interest in the securitized pool and to communicate the offering document to the first computer system.

33. The method of any one of claims 1, 2, further including generating, by the computer, financial analysis output including an offering document for the interest in the securitized pool and communicating the offering document to a bidder computer system.

34. The method of any one of claims 3, 4, further including receiving signals representing data comprising an offering document for the interest in the securitized pool from an other computer system.

35. The method of claim 21, wherein the receiving includes receiving signals representing data comprising an offering document for the interest in the securitized pool from an other computer system.

36. The apparatus of claim 11, wherein the receiving input data includes receiving signals representing data comprising an offering document for the interest in the securitized pool from an other computer system.

37. The apparatus of claim 23, wherein the receiving input data includes receiving signals representing data comprising an offering document for the interest in the securitized pool from one of the other computer system and another computer system.

38. The method of claim 14, wherein the receiving input data includes receiving signals representing one of the at least some of the input data and at least some of the input data from an other computer system.

39. The method of claim 15, wherein the receiving input data includes receiving signals representing one of the at least some of the input data and at least some of the input data from one of the other computer system and another computer system.

40. The method of claim 20, further including generating, by the computer, financial analysis output including an offering document for the interest in the securitized pool and communicating the offering document to a bidder computer system, wherein the bidder computer system is one of the other computer system and another computer system.

41. The apparatus of any one of claims 26, 27, wherein the second computer system is further controlled to generate output comprising a financial document including one of the price and the valuation.

42. The apparatus of any one of claims 26, 27, wherein the second computer system is further controlled to generate output comprising a financial document including one of the price and the valuation and to communicate at least some of the output including the financial document to the first computer system.

43. The apparatus of any one of claims 26, 27, wherein the second computer system is further controlled to generate output comprising a financial document including one of the price and the valuation and to communicate at least some of the output including the financial document to an other computer system.

\* \* \* \* \*